US010284356B2

(12) United States Patent
Bharadia et al.

(10) Patent No.: US 10,284,356 B2
(45) Date of Patent: *May 7, 2019

(54) SELF-INTERFERENCE CANCELLATION

(71) Applicant: The Board of Trustees of the Leland Stanford Junior University, Palo Alto, CA (US)

(72) Inventors: Dinesh Bharadia, Stanford, CA (US); Sachin Katti, Stanford, CA (US); Emily McMilin, Stanford, CA (US); Mayank Jain, San Jose, CA (US); Jung Il Choi, Saratoga, CA (US); Kannan Srinivasan, Dublin, OH (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 14/456,807

(22) Filed: Aug. 11, 2014

(65) Prior Publication Data
US 2014/0348018 A1 Nov. 27, 2014
US 2017/0187513 A9 Jun. 29, 2017

Related U.S. Application Data

(63) Continuation-in-part of application No. 13/913,323, filed on Jun. 7, 2013, now Pat. No. 9,331,737, and a
(Continued)

(51) Int. Cl.
*H04L 5/14* (2006.01)
*H04B 1/525* (2015.01)
(Continued)

(52) U.S. Cl.
CPC ............ *H04L 5/1461* (2013.01); *H04B 1/525* (2013.01); *H04B 1/56* (2013.01); *H04L 5/1423* (2013.01); *H04B 1/126* (2013.01)

(58) Field of Classification Search
CPC .......... H04B 1/126; H04B 1/525; H04B 1/56; H04L 5/1423; H04L 5/146
(Continued)

(56) References Cited

U.S. PATENT DOCUMENTS

| 3,922,617 | A | 11/1975 | Denniston et al. |
| 4,952,193 | A | 8/1990 | Talwar |

(Continued)

FOREIGN PATENT DOCUMENTS

| EP | 0755141 A2 | 10/2005 |
| EP | 1959625 B1 | 2/2009 |

(Continued)

OTHER PUBLICATIONS

Bharadia et al., "Full Duplex Radios" SIGOMM, Aug. 12-16, 2013, Hong Kong, China, Copyright 2013 ACM 978-1-4503-2056-6/6/13/08, 12 pages.
(Continued)

*Primary Examiner* — Mark H Rinehart
*Assistant Examiner* — Kokou R Detse
(74) *Attorney, Agent, or Firm* — Alston & Bird LLP

(57) ABSTRACT

A wireless communication device includes, in part, an analog interference cancellation circuit and a controller. The analog cancellation circuit includes a multitude of delay paths each including a delay element and a variable attenuator. The controller dynamically varies the attenuation level of each of the variable attenuators in accordance with the frequency response characteristic of that attenuator to remove a portion of a self-interference signal present in a signal received by the device. The device measures the frequency response characteristic of the communication channel, used in determining the attenuation levels, via one or more preamble symbols. A second portion of the self-interference signal is removed by the device using a multi-
(Continued)

tude of samples of a transmitted signal and a multitude of samples of a signal to be transmitted.

20 Claims, 17 Drawing Sheets

Related U.S. Application Data continuation-in-part of application No. 13/293,069, filed on Nov. 9, 2011, now Pat. No. 9,887,728, and a continuation-in-part of application No. 13/293,072, filed on Nov. 9, 2011.

(60) Provisional application No. 61/485,980, filed on May 13, 2011, provisional application No. 61/462,493, filed on Feb. 3, 2011, provisional application No. 61/864,492, filed on Aug. 9, 2013.

(51) Int. Cl.
*H04B 1/56* (2006.01)
*H04B 1/12* (2006.01)

(58) Field of Classification Search
USPC .................................................. 370/252, 278
See application file for complete search history.

(56) References Cited

U.S. PATENT DOCUMENTS

| | | | |
|---|---|---|---|
| 5,212,827 A | 5/1993 | Meszko et al. | |
| 5,444,864 A | 8/1995 | Smith | |
| 5,691,978 A * | 11/1997 | Kenworthy | H04B 1/408 |
| | | | 370/278 |
| 5,734,967 A | 3/1998 | Kotzin et al. | |
| 5,790,658 A | 8/1998 | Yip et al. | |
| 5,930,301 A * | 7/1999 | Chester | H03C 3/403 |
| | | | 375/296 |
| 6,215,812 B1 | 4/2001 | Young et al. | |
| 6,411,250 B1 | 6/2002 | Oswald et al. | |
| 6,539,204 B1 | 3/2003 | Marsh et al. | |
| 6,567,649 B2 | 5/2003 | Souissi | |
| 6,639,551 B2 | 10/2003 | Li et al. | |
| 6,725,017 B2 | 4/2004 | Blount et al. | |
| 6,745,018 B1 | 6/2004 | Zehavi et al. | |
| 6,965,657 B1 | 11/2005 | Rezvani et al. | |
| 7,336,940 B2 | 2/2008 | Smithson | |
| 7,349,505 B2 | 3/2008 | Blount et al. | |
| 7,362,257 B2 | 4/2008 | Bruzzone et al. | |
| 7,426,242 B2 | 9/2008 | Thesling | |
| 7,869,527 B2 | 1/2011 | Vetter et al. | |
| 8,055,235 B1 | 11/2011 | Gupta et al. | |
| 8,060,803 B2 | 11/2011 | Kim | |
| 8,086,191 B2 | 12/2011 | Fukuda et al. | |
| 8,155,595 B2 | 4/2012 | Sahin et al. | |
| 8,175,535 B2 | 5/2012 | Mu | |
| 8,179,990 B2 | 5/2012 | Orlik et al. | |
| 8,218,697 B2 | 7/2012 | Guess et al. | |
| 8,331,477 B2 | 12/2012 | Huang et al. | |
| 8,351,533 B2 | 1/2013 | Shrivastava et al. | |
| 8,385,871 B2 * | 2/2013 | Wyville | H03H 11/344 |
| | | | 330/151 |
| 8,422,540 B1 | 4/2013 | Negus et al. | |
| 8,755,756 B1 | 6/2014 | Zhang et al. | |
| 8,995,410 B2 | 3/2015 | Balan et al. | |
| 9,042,838 B2 | 5/2015 | Braithwaite | |
| 9,054,795 B2 | 6/2015 | Choi et al. | |
| 9,065,519 B2 | 6/2015 | Cyzs et al. | |
| 9,077,421 B1 * | 7/2015 | Mehlman | H04B 1/10 |
| 9,124,475 B2 | 9/2015 | Li et al. | |
| 9,184,902 B2 | 11/2015 | Khojastepour et al. | |
| 9,887,728 B2 * | 2/2018 | Jain | H04B 1/525 |
| 2002/0064245 A1 | 5/2002 | McCorkle | |
| 2003/0031279 A1 | 2/2003 | Blount et al. | |
| 2003/0099287 A1 | 5/2003 | Arambepola | |
| 2003/0148748 A1 | 8/2003 | Shah | |
| 2004/0106381 A1 | 6/2004 | Tiller | |
| 2005/0078743 A1 | 4/2005 | Shohara | |
| 2005/0129152 A1 | 6/2005 | Hillstrom | |
| 2005/0159128 A1 | 7/2005 | Collins et al. | |
| 2005/0190870 A1 | 9/2005 | Blount et al. | |
| 2005/0254555 A1 | 11/2005 | Teague | |
| 2005/0282500 A1 | 12/2005 | Wang et al. | |
| 2006/0029124 A1 | 2/2006 | Grant et al. | |
| 2006/0030277 A1 | 2/2006 | Cyr et al. | |
| 2006/0058022 A1 | 3/2006 | Webster et al. | |
| 2006/0083297 A1 | 4/2006 | Yan et al. | |
| 2006/0209754 A1 | 9/2006 | Ji et al. | |
| 2007/0018722 A1 | 1/2007 | Jaenecke | |
| 2007/0105509 A1 | 5/2007 | Muhammad et al. | |
| 2007/0207747 A1 | 9/2007 | Johnson et al. | |
| 2007/0223617 A1 | 9/2007 | Lee et al. | |
| 2007/0249314 A1 | 10/2007 | Sanders et al. | |
| 2007/0274372 A1 | 11/2007 | Asai et al. | |
| 2008/0037801 A1 | 2/2008 | Alves et al. | |
| 2008/0089397 A1 | 4/2008 | Vetter et al. | |
| 2008/0107046 A1 | 5/2008 | Kangasmaa et al. | |
| 2008/0131133 A1 | 6/2008 | Blunt et al. | |
| 2008/0192636 A1 | 8/2008 | Briscoe et al. | |
| 2008/0219339 A1 * | 9/2008 | Chrabieh | H04L 5/0007 |
| | | | 375/231 |
| 2008/0219377 A1 | 9/2008 | Nisbet | |
| 2009/0022089 A1 | 1/2009 | Rudrapatna | |
| 2009/0034437 A1 | 2/2009 | Shin et al. | |
| 2009/0047914 A1 | 2/2009 | Axness et al. | |
| 2009/0115912 A1 | 5/2009 | Liou et al. | |
| 2009/0180404 A1 | 7/2009 | Jung et al. | |
| 2009/0186582 A1 | 7/2009 | Muhammad et al. | |
| 2009/0221231 A1 | 9/2009 | Weng et al. | |
| 2009/0303908 A1 | 12/2009 | Deb et al. | |
| 2010/0014600 A1 | 1/2010 | Li et al. | |
| 2010/0014614 A1 | 1/2010 | Leach et al. | |
| 2010/0022201 A1 * | 1/2010 | Vandenameele | H04L 25/0248 |
| | | | 455/78 |
| 2010/0031036 A1 * | 2/2010 | Chauncey | H04L 63/0428 |
| | | | 713/168 |
| 2010/0056166 A1 | 3/2010 | Tenny | |
| 2010/0103900 A1 | 4/2010 | Yeh et al. | |
| 2010/0117693 A1 | 5/2010 | Lorg et al. | |
| 2010/0136900 A1 | 6/2010 | Seki | |
| 2010/0150033 A1 | 6/2010 | Zinser et al. | |
| 2010/0159837 A1 | 6/2010 | Dent et al. | |
| 2010/0159858 A1 | 6/2010 | Dent et al. | |
| 2010/0215124 A1 | 8/2010 | Zeong et al. | |
| 2010/0226416 A1 | 9/2010 | Dent et al. | |
| 2010/0226448 A1 | 9/2010 | Dent | |
| 2010/0232324 A1 | 9/2010 | Radunovic et al. | |
| 2010/0279602 A1 | 11/2010 | Larsson et al. | |
| 2010/0295716 A1 | 11/2010 | Yamaki et al. | |
| 2011/0013684 A1 | 1/2011 | Semenov et al. | |
| 2011/0026509 A1 | 2/2011 | Tanaka | |
| 2011/0149714 A1 | 6/2011 | Rimini et al. | |
| 2011/0171922 A1 | 7/2011 | Kim et al. | |
| 2011/0216813 A1 | 9/2011 | Baldemair et al. | |
| 2011/0222631 A1 | 9/2011 | Jong | |
| 2011/0243202 A1 | 10/2011 | Lakkis | |
| 2011/0256857 A1 * | 10/2011 | Chen | H04B 1/525 |
| | | | 455/422.1 |
| 2011/0268232 A1 | 11/2011 | Park et al. | |
| 2011/0311067 A1 | 12/2011 | Harris et al. | |
| 2011/0319044 A1 | 12/2011 | Bornazyan | |
| 2012/0021153 A1 | 1/2012 | Bhandari et al. | |
| 2012/0063369 A1 | 3/2012 | Lin et al. | |
| 2012/0063373 A1 | 3/2012 | Chincholi et al. | |
| 2012/0140685 A1 * | 6/2012 | Lederer | H04L 27/3854 |
| | | | 370/286 |
| 2012/0147790 A1 * | 6/2012 | Khojastepour | H01Q 3/2605 |
| | | | 370/277 |
| 2012/0154249 A1 | 6/2012 | Khojastepour et al. | |
| 2012/0155335 A1 | 6/2012 | Khojastepour et al. | |
| 2012/0155336 A1 | 6/2012 | Khojastepour et al. | |
| 2012/0201153 A1 | 8/2012 | Bharadia et al. | |

(56) References Cited

U.S. PATENT DOCUMENTS

| | | | |
|---|---|---|---|
| 2012/0201173 A1* | 8/2012 | Jain | H04B 1/525 370/277 |
| 2013/0005284 A1 | 1/2013 | Dalipi | |
| 2013/0044791 A1 | 2/2013 | Rimini et al. | |
| 2013/0089009 A1 | 4/2013 | Li et al. | |
| 2013/0102254 A1 | 4/2013 | Cyzs et al. | |
| 2013/0114468 A1 | 5/2013 | Hui et al. | |
| 2013/0155913 A1 | 6/2013 | Sarca | |
| 2013/0166259 A1 | 6/2013 | Weber et al. | |
| 2013/0194984 A1 | 8/2013 | Cheng et al. | |
| 2013/0215805 A1 | 8/2013 | Hong et al. | |
| 2013/0225101 A1 | 8/2013 | Basaran et al. | |
| 2013/0253917 A1 | 9/2013 | Schildbach | |
| 2013/0301487 A1 | 11/2013 | Khandani | |
| 2013/0301488 A1 | 11/2013 | Hong et al. | |
| 2014/0126437 A1 | 5/2014 | Patil et al. | |
| 2014/0169236 A1 | 6/2014 | Choi et al. | |
| 2014/0206300 A1 | 7/2014 | Hahn et al. | |
| 2014/0219139 A1 | 8/2014 | Choi et al. | |
| 2014/0348018 A1 | 11/2014 | Bharadia et al. | |
| 2015/0156003 A1 | 6/2015 | Khandani | |
| 2015/0156004 A1 | 6/2015 | Khandani | |
| 2016/0226653 A1 | 8/2016 | Bharadia et al. | |
| 2016/0234005 A1 | 8/2016 | Hong et al. | |
| 2016/0266245 A1 | 9/2016 | Bharadia et al. | |
| 2017/0090026 A1 | 3/2017 | Joshi et al. | |
| 2017/0264420 A1 | 9/2017 | Bharadia et al. | |

FOREIGN PATENT DOCUMENTS

| | | |
|---|---|---|
| EP | 2237434 A1 | 10/2010 |
| EP | 2267946 A2 | 12/2010 |
| JP | 2001-196949 A | 7/2001 |
| JP | 2004-56315 A | 2/2004 |
| RU | 2256985 C2 | 7/2005 |
| WO | WO 2009/106515 A1 | 9/2009 |
| WO | WO 2012/106262 A1 | 8/2012 |
| WO | WO 2012/106263 A1 | 8/2012 |
| WO | 2013/185106 A1 | 12/2013 |
| WO | 2014/093916 A1 | 6/2014 |
| WO | WO 2014/093916 A1 | 6/2014 |
| WO | WO 2014/121290 A1 | 8/2014 |
| WO | WO 2015/021481 A2 | 2/2015 |
| WO | WO 2015/048678 A1 | 4/2015 |
| WO | WO 2015/073905 A2 | 5/2015 |

OTHER PUBLICATIONS

Written Opinion for PCT Application No. PCT/US2013/044830, dated Sep. 26, 2013, 4 pages.
International Preliminary Report on Patentablility for PCT Application No. PCT/US2013/044830, dated Dec. 18, 2014, 5 pages.
International Search Report and Written Opinion for PCT Application No. PCT/US2014/050584 dated Jan. 21, 2015, 11 pages.
International Search Report and Written Opinion for PCT Application No. PCT/US2014/065814 dated Feb. 19, 2015, 11 pages.
Non-Final Office Action for U.S. Appl. No. 13/762,043 dated Nov. 17, 2014, 9 pages.
Non-Final Office Action for U.S. Appl. No. 13/913,323 dated Mar. 12, 2015, 11 pages.
Final Office Action for U.S. Appl. No. 13/913,323 dated Apr. 21, 2015, 5 pages.
Final Office Action for U.S. Appl. No. 13/762,043 dated Jun. 8, 2015, 11 pages.
Final Office Action for U.S. Appl. No. 13/293,069, dated Oct. 21, 2014, 17 pages.
International Search Report and Written Opinion for PCT Application No. PCT/US2014/014726 dated Jun. 2, 2014, 38 pages.
Non-Final Office Action for U.S. Appl. No. 13/293,069 dated May 1, 2014, 16 pages.
International Search Report and Written Opinion for PCT Application No. PCT/US2013/075166 dated Apr. 22, 2014, 11 pages.
Final Office Action for U.S. Appl. No. 13/293,072, dated Mar. 31, 2014, 10 pages.
International Search Report for PCT Application No. PCT/US2013/044830, dated Sep. 26, 2013, 2 pages.
International Preliminary Report on Patentablility for PCT Application No. PCT/US2012/023184 dated Aug. 6, 2013, 5 pages.
International Preliminary Report on Patentablility for PCT Application No. PCT/US2012/023183 dated Aug. 6, 2013, 5 pages.
Non-Final Office Action for U.S. Appl. No. 13/293,072, dated Jul. 19, 2013, 10 pages.
Non-Final Office Action for U.S. Appl. No. 13/293,069, dated Jul. 17, 2013, 12 pages.
International Search Report and Written Opinion for PCT Application No. PCT/US2012/023183 dated May 17, 2012, 6 pages.
International Search Report and Written Opinion for PCT Application No. PCT/US2012/023184 dated May 17, 2012, 6 pages.
Adib et al., "See Through Walls with Wi-Fi!," Proceedings of the ACM SIGCOMM 2013 conference on SIGCOMM, SIGCOMM '13, pp. 75-86, ACM, New York, NY, USA, (2013).
Bharadia, "Full Duplex Backscatter," Proceedings of the 12th ACM Workshop on Hot Topics in Networks, 7 pages, ACM, (2013).
Bindu et al., "Active microwave imaging for breast cancer detection," Progress In Electromagnetics Research, vol. 58: 149-169, (2006).
Boyd, "Sequential Convex Programming." [Retrieved from the Internet Oct. 26, 2016: http://www.stanford.edu/class/ ee364b/lectures/seq_slides.pdf].
Cavoukian, "Whole Body Imaging in Airport Scanners: Building in Privacy by Design," Information and Privacy Commissioner of Ontario, Mar. 2009. [Retrieved from the Internet Oct. 25, 2016: https://www.ipc.on.ca/wp-content/uploads/.../wholebodyimaging.pdf].
Duarte et al., "Experiment-driven Characterization of Full-Duplex Wireless Systems," (2011). [Retrieved from the Internet Oct. 25, 2016: https://arxiv.org/abs/1107.1276].
Ekanadham, "Continuous Basis Pursuit and Its Applications," PhD thesis, New York, NY, USA, AAI3546394, (2012).
Erceg et al., "TGn channel models," Tech. Rep. IEEE P802.11, Wireless LANs, Garden Grove, Calif, USA, (2004).
FDA, "Medical Imaging," [Retrieved from the Internet Oct. 25, 2016: http://www.fda.gov/Radiation-EmittingProducts/RadiationEmittingProductsandProcedures/MedicalImaging/MedicalX-Rays/ucm115317.htm].
Fear et al., "Confocal Microwave Imaging for Breast Cancer Detection: Localization of Tumors in Three Dimensions," IEEE Transactions on Biomedical Engineering, 49(8):812-822, (2002).
Fear et al., "Microwave Detection of Breast Cancer," IEEE Transactions on Microwave Theory and Techniques, 48(11):1854-1863, (2000).
Fleury et al., "Channel Parameter Estimation in Mobile Radio Environments Using the SAGE Algorithm," IEEE Journal on Selected Areas in Communications, 17(3):434-450, (1999).
Guo et al., "Microwave Imaging via Adaptive Beamforming Methods for Breast Cancer Detection," Progress In Electromagnetics Research, vol. 1, 350-353, (2005).
Hong et al., "Picasso: Flexible RF and Spectrum Slicing," In Proceedings of the ACM SIGCOMM 2012 conference on Applications, technologies, architectures, and protocols for computer communication, SIGCOMM '12, pp. 283-284, ACM, Helsinki, Finland, (2012).
Italian National Research Council, "Dielectric Properties of Body Tissues." [Retrieved from the Internet Oct. 25, 2016: http://niremf.ifac.cnr.it/tissprop/].
Jain et al., "Practical, Real-Time, Full Duplex Wireless," MobiCom '11, pp. 301-312, ACM, New York, NY, USA, (2011).
Sundstrom et al., "Power Dissipation Bounds for High-Speed Nyquist Analog-to-Digital Converters," IEEE Transactions on Circuits and Systems I: Regular Papers, 56(3):509-518, (2009).
Surowiec et al., "Dielectric Properties of Breast Carcinoma and the Surrounding Tissues," IEEE Transactions on Biomedical Engineering, 35(4):257-263, (1988).

(56) References Cited

OTHER PUBLICATIONS

Tibshirani, "Regression shrinkage and selection via the lasso," Journal of the Royal Statistical Society, Series B (Methodological), pp. 267-288 (1996).
Tse et al., "Fundamentals of Wireless Communications,"Aug. 13, 2004. [Retrieved from the Internet Oct. 25, 2016: www.eecs.berkeley.edu/~dtse/main.pdf].
Wikipedia, "Star Trek Tricoder," [Retrieved from the Internet Oct. 26, 2016: http: //en.wikipedia.org/wiki/Tricorder].
Xiong et al., "ArrayTrack: A Fine-Grained Indoor Location System" In Proceedings of the 10th USENIX conference on Networked Systems Design and Implementation, nsdi'13, pp. 71-84, USENIX Association, Berkeley, CA, USA, (2013).
Zhang et al., "A novel method for microwave breast cancer detection," Progress In Electromagnetics Research, vol. 83: 413-434, (2008).
U.S. Appl. No. 13/293,069, Final Office Action dated May 2, 2017.
U.S. Appl. No. 13/293,069, Non-Final Office Action dated Jan. 6, 2017.
U.S. Appl. No. 13/293,072, Non-Final Office Action dated Jan. 13, 2017.
U.S. Appl. No. 13/293,069, Advisory Action dated Aug. 29, 2017.
U.S. Appl. No. 13/293,069, Notice of Allowance dated Sep. 27, 2017.
U.S. Appl. No. 13/293,069, Notice of Allowance dated Oct. 6, 2017.
U.S. Appl. No. 13/293,072, Final Office Action dated Aug. 3, 2017.
U.S. Appl. No. 15/025,256, Non-Final Office Action dated Oct. 19, 2017.
U.S. Appl. No. 15/133,175, Non-Final Office Action dated Sep. 21, 2017.
Chinese Application No. 201380041721.0, First Office Action dated Nov. 18, 2015.
EPO Application No. 20130801200, Supplementary European Search Report dated Feb. 4, 2016.
PCT International Preliminary Report on Patentability for application PCT/US2013/075166 dated Jun. 16, 2015.
PCT International Preliminary Report on Patentability for application PCT/US2014/014726 dated Aug. 4, 2015.
PCT International Preliminary Report on Patentability for application PCT/US2014/050584 dated Feb. 9, 2016.
PCT International Preliminary Report on Patentability for application PCT/US2014/058117 dated Mar. 29, 2016.
PCT International Preliminary Report on Patentability for application PCT/US2014/065814 dated May 17, 2016.
PCT International Search Report and Written Opinion of the International Searching Authority for application PCT/US2014/058117 dated Dec. 30, 2014.
U.S. Appl. No. 13/293,069, Final Office Action dated Jun. 8, 2016.
U.S. Appl. No. 13/293,069, Non-Final Office Action dated Sep. 21, 2015.
U.S. Appl. No. 13/293,072, Final Office Action dated Mar. 15, 2016.
U.S. Appl. No. 13/293,072, Non-Final Office Action dated Jul. 17, 2015.
U.S. Appl. No. 13/762,043, Notice of Allowance dated Nov. 9, 2015.
U.S. Appl. No. 13/913,323, Notice of Allowance dated Feb. 12, 2016.
U.S. Appl. No. 13/913,323, Notice of Allowance dated Oct. 16, 2015.
U.S. Appl. No. 13/913,323, Notice of Allowance dated Nov. 5, 2015.
U.S. Appl. No. 13/913,323, Notice of Allowance dated Nov. 13, 2015.
Archer, et al., "Interface Contracts for TinyOS," IPSN '07: Proceedings of the 6th international conference on Information processing in sensor networks, pp. 158-165 (2007).
Aryafar, et al., "MIDU: Enabling MIMO Full Duplex," Proceedings of the 18th annual international conference on Mobile computing and networking, Mobicom '12, pp. 257-268, (2012).

Bahl, et al., "Reconsidering Wireless Systems With Multiple Radios," ACM SIG-COMM CCR, (2004).
Bahl, et al., "White Space Networking with Wi-Fi like Connectivity," SIGCOMM Comput. Commun. Rev., 39(4):27-38, (2009).
Bardwell, "Tech Report." [Retrieved from the Internet Dec. 3, 2016: <http://www.connect802.com/download/techpubs/2005/commercial_radios_E052315.pdf>].
Bicket, "Bit-rate Selection in Wireless Networks," Master's thesis, MIT, 2005.
Blefari-Melazzi, et al., "TCP Fairness Issues in IEEE 802.11 Networks: Problem Analysis and Solutions Based on Rate Control," IEEE Transactions on Wireless Communications, 6(4):1346-1355 (2007).
Bliss, et al., "Simultaneous Transmission and Reception for Improved Wireless Network Performance," Proceedings of the 2007 IEEE Workshop on Statistical Signal Processing, (2007).
Bortz, et al., "The Simplex Gradient and Noisy Optimization Problems," North Carolina State University, Department of Mathematics, Center for Research in Scientific Computation, (1998).
Briggs, et al., "Power Measurements of OFDM Signals," IEEE Symposium on Electromagnetic Compatibility, (2004).
Burlingame, et al., "An Analog CMOS High-Speed Continuous-Time FIR Filter," Solid-State Circuits Research Laboratory, Department of Electrical and Computer Engineering, University of California, Davis, CA, (2000).
Chandra, "A Case for Adapting Channel Width in Wireless Networks," ACM SIGCOMM, (2008).
Choi, et al., "Granting Silence to Avoid Wireless Collisions," Proceedings of the 18th International Conference on Network Protocols (ICNP), (2010).
Choi, et al., "IEEE 802.11e Contention-Based Channel Access (EDCF) Performance Evaluation," IEEE ICC (2003).
Choi, et al., "The Case for a Network Protocol Isolation Layer," Sensys '09: Proceedings of the 7th ACM Conference on Embedded networked sensor systems (SenSys), pp. 267-280, (2009).
Chu, et al., "The Design and Implementation of a Declarative Sensor Network System," Proceedings of the 5th international conference on Embedded networked sensor systems, (2007).
Coffman, et al., "Channel Fragmentation in Dynamic Spectrum Access Systems—a Theoretical Study," ACM SIGMETRICS, (2010).
Culler, et al., "Towards a Sensor Network Architecture: Lowering the Waistline," Proceedings of the Tenth Workshop on Hot Topics in Operating Systems (HotOS-X), (2005).
Ding, "Digital Predistortion of Power Amplifiers for Wireless Applications," Ph.D Thesis, School of Electrical and Computer Engineering, Georgia Institute of Technology, (Mar. 2004).
Duarte, "Experiment-driven Characterization of Full-Duplex Wireless Systems," CoRR, abs/1107.1276, (2011).
Duarte, et al., "Full-Duplex Wireless Communications Using Off-The-Shelf Radios: Feasibility and First Results," Forty-Fourth Asilomar Conference on Signals, Systems, and Components, (2010).
Ettus Research, UHD Daughterboard Application Notes. [Retrieved from the Internet Dec. 8, 2016: <http://files.ettus.com/uhd_docs/manual/html/dboards.html>].
Ettus Research, Universal Software Radio Peripheral (USRP). [Retrieved from the Internet Dec. 3, 2016: <http://www.ettus.com>].
Everett, et al., "Empowering Full-Duplex Wireless Communication by Exploiting Directional Diversity," 2011 Conference Record of the Forty Fifth Asilomar Conference on Signals, Systems and Computers, pp. 2002-2006, (Nov. 2011).
Everett, et al., "Passive Self-Interference Suppression for Full-Duplex Infrastructure Nodes," CoRR, abs/1302.2185, (2013).
FCC, Table of Frequency Allocations. [Retrieved from the Internet Dec. 3, 2016: <http://transition.fcc.gov/oet/spectrum/table/fcctable.pdf>].
Fear, et al., "Enhancing breast tumor detection with near-field imaging," Microwave Magazine, IEEE, 3(1):48-56, (2002).
Gember, et al., "A Comparative Study of Handheld and Non-Handheld Traffic in Campus Wi-Fi Networks," Passive and Active Measurement Conf., (2011).
Gheorma, et al., "Rf Photonic Techniques for Same Frequency Simultaneous Duplex Antenna Operation," IEEE Photonics Technology Letters, 19(13): 1014-1016, (2007).

(56) References Cited

OTHER PUBLICATIONS

Gill, Slide Presentation: "RF performance of mobile terminals—a challenge for the industry," Cambridge Wireless Radio Technology Special Interest Group (SIG), (2011).
Gizmodo, "IPhone 4 Antenna-Gate," (2011). [Retrieved from the Internet Dec. 3, 2016: <http://gizmodo.com/5846638/giz-explains-whats-so-smart-about-the-iphone-4ss-antenna>].
Gnawali, et al., "Collection Tree Protocol," Proceedings of the 7th ACM Conference on Embedded Networked Sensor Systems (SenSys), pp. 1-14 (2009).
Goldsmith, "Wireless Communications," Cambridge University Press, (2004).
Gollakota, et al., "They Can Hear Your Heartbeats: Non-Invasive Security for Implantable Medical Devices," SIGCOMM Comput. Commun. Rev., 41(4), (Aug. 2011).
Gollakota, et al., "ZigZag Decoding: Combating Hidden Terminals in Wireless Networks," SIGCOMM '08: Proceedings of the ACM SIGCOMM 2008 Conference on Data Communication, pp. 159-170, (2008).
Gummadi, et al., "Understanding and Mitigating the Impact of RF Interference on 802.11 Networks," Proceedings of the 2007 conference on Applications, technologies, architectures, and protocols for computer communications (SIGCOMM), (2007).
Halperin, et al., "Taking the Sting out of Carrier Sense: Interference Cancellation for Wireless LANs." MobiCom '08: Proceedings of the 14th ACM international conference on Mobile computing and networking, pp. 339-350, (2008).
Harashima, "Matched-Transmission Technique for Channels With Intersymbol Interference," IEEE Transactions on Communications, COM-20:774-780, (1972).
Hong, et al, "DOF: A Local Wireless Information Plane," ACM SIGCOMM, (2011).
Hua, et al., "A method for Broadband Full-Duplex Mimo Radio," IEEE Signal Processing Letters, 19(12):793-796, (Dec. 2012).
Huang, "Optimal Transmission Strategies for Dynamic Spectrum Access in Cognitive Radio Networks," IEEE Transactions on Mobile Computing, 8(12): 1636-1648, (2009).
Huyer, et al., "SNOBFIT—Stable Noisy Optimization by Branch and Fit," ACM Trans. Math. Softw., 35:9:1-9:25, (Jul. 2008).
Intersil Corp, "Qhx220 Active Isolation Enhancer and Interference Canceller." [Retrieved from the Internet Dec. 6, 2016: <http://www.intersil.com/content/dam/Intersil/documents/qhx2/qhx220.pdf>].
Iyer, et al., "Specnet: Spectrum Sensing Sans Frontiers," USENIX NSDI, (2011).
Jamieson, et al., "PPR: Partial Packet Recovery for Wireless Networks," Proceedings of the 2007 conference on Applications, technologies, architectures, and protocols for computer communications (SIGCOMM), (2007).
Jiang, et al., "An Architecture for Energy Management in Wireless Sensor Networks," Proceedings of the International Workshop on Wireless Sensornet Architecture (WWSNA), (2007).
Jung, et al., "A Reconfigurable Carrier Leakage Canceler for UHF RFID Reader Front-Ends," IEEE Transactions on Circuits and Systems I: Regular Papers, 58(1):70-76, (Jan. 2011).
Khojastepour, et al., "The Case for Antenna Cancellation for Scalable Full Duplex Wireless Commications," ACM HOTNETS, (2011).
Kim, et al., "Co-Channel Interference Cancellation Using Single Radio Frequency and Baseband Chain," IEEE Transactions on Communications, 58(7):2169-2175, (2010).
Kim, et al., "Flush: A Reliable Bulk Transport Protocol for Multihop Wireless Networks," In Proceedings of the Fifth ACM Conference on Embedded networked sensor systems (SenSys), (2007).
Klues, et al., "Integrating Concurrency Control and Energy Management in Device Drivers," Proceedings of twenty-first ACM SIGOPS symposium on Operating systems principles (SOSP), (2007).
Knox, "Single Antenna Full Duplex Communications using a Common Carrier," 2012 IEEE 13th Annual Wireless and Microwave Technology Conference (WAMICON), pp. 1-6, (2012).
Lakshminarayanan, et al., "Rfdump; An Architecture for Monitoring the Wireless Ether," ACM CoNEXT, (2009).
Lamprecht, et al., "Passive Alignment of Optical Elements in a Printed Circuit Board," Electric Componenets and Technology Conference, (2006).
Lee, et al., "Improving Wireless Simulation Through Noise Modeling," Proceedings of the 6th international conference on Information processing in sensor networks (IPSN), pp. 21-30, (2007).
Leith, et al., "TCP Fairness in 802.11e WLANs," IEEE Communications Letters, 9(12), (2005).
Levis, et al., "T2: A Second Generation OS for Embedded Sensor Networks," Technical Report TKN-05-007, Telecommunication Networks Group, Technische Universitat Berlin, (2005).
Liang, et al., "Sensing-Throughput Tradeoff for Cognitive Radio Networks," IEEE Transactions on Wireless Communications, 7(4): 1326-1337, (2008).
Liang, et al., "Surviving Wi-Fi Interference in Low Power Zigbee Networks," Proceedings of the Eighth ACM Conference on Embedded Networked Sensor Systems (SenSys), (2010).
Lin, et al., "Data Discovery and Dissemination with DIP," Proceedings of the 7th international conference on Information processing in sensor networks (IPSN), pp. 433-444, (2008).
Matheus, "Optimal Design of a Multicarrier Systems with Soft Impulse Shaping Including Equalization in Time or Frequency Direction," Global Telecommunications Conference, 1997, GLOBECOM '97, IEEE, vol. 1, pp. 310-314, (Nov. 1997).
Maxim Integrated, Power Amplifier Data-sheet. [Retrieved from the Internet Dec. 6, 2016: <http://datasheets.maximintegrated.com/en/ds/MAX2828-MAX2829.pdf>].
Mini-Circuits, Power Amplifier Data-sheet. [Retrieved from the Internet Dec. 6, 2016: <http://www.minicircuits.com/pdfs/PGA-105+.pdf>].
Mini-Circuits, Power Amplifier Data-sheet. [Retrieved from the Internet Dec. 6, 2016: <http://www.minicircuits.com/pdfs/ZHL-30W-262+.pdf>].
Morgan, et al, "A Generalized Memory Polynomial Model for Digital Predistortion of RF Power Amplifiers," IEEE Transactions on Signal Processing, 54(10):3852-3860, (2006).
National Instruments, N1 5781 Datasheet, (2011). [Retrieved from the Internet Dec. 6, 2016: <http://sine.ni.com/ds/app/doc/p/id/ds-212/lang/en>].
National Instruments, NI PXIe-8133 User Manual, (Jul. 2012). [Retrieved from the Internet Dec. 13, 2016: <www.ni.com/pdf/manuals/372870d.pdf>].
National Instruments, White Paper: "Understanding Dynamic Hardware Specifications," (Mar. 2010).
Palazzi, et al., "A RIO-Like Technique for Interactivity Loss-Avoidance in Fast-Paced Multiplayer Online Games," ACM Computers in Entertainment, (2005).
Peregrine Semiconductor, PE 47303 Data-sheet. [Retrieved from the Internet Dec. 6, 2016: <http://www.psemi.com/pdf/datasheets/pe43703ds.pdf>].
Polastre, et al., "A Unifying Link Abstraction for Wireless Sensor Networks," SenSys '05: Proceedings of the 3rd international conference on Embedded networked sensor systems, pp. 76-89, (2005).
Poston, et al., "Discontiguous OFDM Considerations for Dynamic Spectrum Access in Idle TV Channels," IEEE DySPAN, (2005).
Radunović, et al., "Efficiency and Fairness in Distributed Wireless Networks Through Self-Interference Cancellation and Scheduling," Technical Report MSR-TR-2009-27, Microsoft Research, (2009).
Radunović, et al., "Rethinking Indoor Wireless Mesh Design: Low Power, Low Frequency, Full-duplex," Fifth IEEE Workshop on Wireless Mesh Networks (WiMesh), pp. 1-6, (2010).
Rahul, et al., "Learning to Share: Narrowband-Friendly Wideband Networks," ACM SIGCOMM, (2008).
Rice University, WARP Project. [Retrieved from the Internet Dec. 8, 2016: <http://warp.rice.edu>].
Rohde & Schwarz, "Rohde & Schwarz FSW Signal and Spectrum Analyzer User Manual," (2016). [Retrieved from the Internet Dec. 10, 2016: <https://cdn.rohde-schwarz.com/pws/dl_downloads/dl_common_library/dl_manuals/gb_1/f/fsw_1/FSW_UserManual_en_26.pdf>].

(56) References Cited

OTHER PUBLICATIONS

Rohde & Schwarz, "Rohde & Schwarz SMBV 100A Signal Generator User Manual," (2016). [Retrieved from the Internet Dec. 6, 2016: <https://cdn.rohde-schwarz.com/pws/dl_downloads/dl_common_library/dl_manuals/gb_1/s/smbv/SMBV100A_OperatingManual_en_16.pdf>].

Sahai, et al., "On the Impact of Phase Noise on Active Cancellation in Wireless Full-Duplex," CoRR, abs/1212.5462, (2012).

Sahai, et al., "Spectrum Sensing: Fundamental limits," draft chapter for a Springer Book: Cognitive Radios: System Design Perspective, (Jun. 2009).

Sen, et al., "AccuRate: Constellation Based Rate Estimation in Wireless Networks," Proceedings of the Seventh USENIX Symposium on Networked Systems Design and Implementation (NSDI), (2010).

Sen, et al., "CSMA/CN: Carrier Sense Multiple Access with Collision Notification," Proceedings of the 16th annual international conference on Mobile computing and networking (MobiCom), pp. 25-36, (2010).

Shen, et al., "Channel Estimation in OFDM Systems," Application Note, Freescale Semiconductor, (2006).

Srinivasan, et al., "Empirical Study of Low-Power Wireless," ACM Transactions on Sensor Networks, 6(2):1-49, (2010).

Srinivasav, et al., "RSSI is Under Appreciated," Proceedings of the Third Workshop on Embedded Networked Sensors (EmNets), (2006).

Srinivasan, et al., "Some Implications of Low Power Wireless to IP Networking," Proceedings of the Fifth Workshop on Hot Topics in Networks (HotNets-V), (Nov. 2006).

Srinivasan, et al., "The κ-Factor: Inferring Protocol Performance Using Inter-Link Reception Correlation," Proceedings of the 16th annual international conference on Mobile computing and networking (MobiCom), (2010).

Srinivasan, et al., The β-factor: Measuring Wireless Link Burstiness, Proceedings of the Sixth ACM Conference on Embedded Networked Sensor Systems, (Nov. 2008).

Tan, et al., "Fine Grained Channel Access in Wireless LAN," ACM SIGCOMM, (2010).

Tan, et al., "Spectrum Virtualization Layer," MSR Tech Report, (2011). [Retrieved from the Internet Dec. 8, 2016: <http://research.microsoft.com/apps/pubs/default.aspx?id=154410>].

Tavakoli, et al., "A Declarative Sensornet Architecture," Proceedings of the International Workshop on Wireless Sensornet Architecture (WWSNA), (2007).

Tomlinson, "New Automatic Equaliser Employing Modulo Arithmetic," Electronic Letters, 7(5/6):138-139, (1971).

Tourrilhes, "Fragment Adaptive Reduction: Coping with Various interferers in radio unlicensed bands," IEEE IC, (2001).

Vutukuru, et al., "Cross-Layer Wireless Bit Rate Adaption," SIGCOMM Comput. Commun. Rev., 39(4):3-14, (2009).

Weingarten, et al., "The Capacity Region of the Gaussian Multiple-Input Multiple-Output Broadcast Channel," IEEE Transactions on Information Theory, 52(9):3936-3964, (2006).

Wi-Fi Alliance, WiFi Direct Industry White Paper, (2010). [Retrieved from the Internet Dec. 13, 2016: <http://www.wi-fi.org/discover-wi-fi/wi-fi-direct>].

Winter, et al., "RPL: IPv6 Routing Protocol for Low power and Lossy Networks," IETF Internet draft (Work in Progress), (Jul. 2010). [Retrieved from the Internet Dec. 8, 2016: <https://tools.ietf.org/id/draft-ietf-roll-rpl-11.txt>].

Wischik, et al., "Design, implementation and evaluation of congestion control for multipath TCP," USENIX NSDI, (2011).

Xilinx, DS249: LogiCore IP CORDIC v4.0 Data Sheet, (Mar. 1, 2011). [Retrieved from the Internet Dec. 3, 2016: <http://www.xilinx.com/support/documentation/ip_documentation/cordic_ds249.pdf>].

Xilinx, UG193: XtremeDSP User Guide, (Jan. 26, 2012). [Retrieved from the Internet Dec. 6, 2016: <https://www.xilinx.com/support/documentation/user_guides/ug193.pdf>].

Yang, et al., "Supporting Demanding Wireless Applications with Frequency-agile Radios," USENIX NSDI, (2010).

Yang, et al., "The Spaces Between Us: Sensing and Maintaining Boundaries in Wireless Spectrum Access," ACM MOBICOM, (2010).

Yoo, et al., "On the Optimality of Multiantenna Broadcast Scheduling Using Zero-Forcing Beamforming," IEEE Journal on Selected Areas in Communications, 24(3):528-541, (2006).

Yuan, et al., "KNOWS: Kognitiv Networking Over White Spaces," IEEE DySPAN, (2007).

Zhang, et al., "Gain/Phase Imbalance-Minimization Techniques for LINC Transmitters," IEEE Transactions on Microwave Theory and Techniques, 49(12):2507-2516, (2001).

U.S. Appl. No. 13/293,072, Applicant Initiated Interview Summary dated Aug. 7, 2018.

U.S. Appl. No. 13/293,072, Final Office Action dated Apr. 5, 2018.

U.S. Appl. No. 15/025,256, Notice of Allowance dated May 21, 2018.

U.S. Appl. No. 15/133,175, Final Office Action dated May 10, 2018.

U.S. Appl. No. 13/293,072, Notice of Allowance dated Dec. 27, 2018.

U.S. Appl. No. 15/025,256, Notice of Allowance dated Jan. 3, 2019.

U.S. Appl. No. 15/133,175, Notice of Allowance dated Nov. 28, 2018.

U.S. Appl. No. 13/293,072, Notice of Allowance dated Oct. 17, 2018.

U.S. Appl. No. 15/025,256, Notice of Allowance dated Sep. 13, 2018.

\* cited by examiner

SELF-INTERFERENCE CANCELLATION

CROSS-REFERENCES TO RELATED APPLICATIONS

The present application claims benefit under 35 USC 119(e) of U.S. Provisional Application No. 61/864,492, filed Aug. 9, 2013, entitled "Full Duplex Radios", the content of which is incorporated herein by reference in its entirety.

The present application is a continuation-in-part of commonly assigned following U.S. Applications, the contents of all of which are incorporated herein by reference in their entirety:

application Ser. No. 13/293,069, filed Nov. 9, 2011, entitled "single Channel Full-Duplex Wireless Communication"; This application claims the benefit of U.S. Provisional Patent Application Ser. No. 61/462,493, filed on Feb. 3, 2011, and entitled "Single Channel Full Duplex Wireless Communications," and U.S. Provisional Patent Application Ser. No. 61/485,980, filed on May 13, 2011, and entitled "Adaptive Techniques For Full-Duplex Wireless," both of which are incorporated by reference herein in their entirety;

application Ser. No. 13/293,072, filed Nov. 9, 2011, entitled "Adaptive Techniques For Full-Duplex Communications"; this application claims the benefit of U.S. Provisional Patent Application Ser. No. 61/485,980, filed on May 13, 2011, and entitled "Adaptive Techniques For Full-Duplex Wireless," and U.S. Provisional Patent Application Ser. No. 61/462,493, filed on Feb. 3, 2011, and entitled "Single Channel Full Duplex Wireless Communications," both of which are incorporated by reference herein in their entirety; and application Ser. No. 13/913,323, filed Jun. 7, 2013, entitled "Systems and Methods for Cancelling Interference using Multiple Attenuation Delays".

The present application incorporates herein by reference in its entirety article entitled "Full Duplex Radios", by Dinesh Bharadia, Sachin Katti, Emily McMilin, SIGOMM, August 2013.

TECHNICAL FIELD

The present invention relates to wireless communication systems, and more particularly to cancellation of self-interference in full-duplex wireless communication systems.

BACKGROUND OF THE INVENTION

Conventional wireless communications systems operate in a half-duplex mode by transmitting and receive signals via different frequency channels. Transmitting and receiving signals via the same frequency channel, commonly referred to as full duplex, reduces the frequency spectrum used for transmission. However, conventional full-duplex communication systems suffer from self-interference thereby overwhelming the system's receiver and preventing it from operating properly. For example if a WiFi radio transmits at 20 dBm (100 mW), and the noise floor of the radio is −90 dBm (i.e., 105 dB lower than the transmit signal power), self-interference has to be canceled by at least 110 dB to render it negligible. A need continues to exist for a full-duplex wireless communications system that cancels or minimizes the self-interference signal to a negligible amount and in a relatively short time period.

BRIEF SUMMARY OF THE INVENTION

A wireless communication system, in accordance with one embodiment of the present invention includes, in part, a transmit path adapted to transmit a transmit signal, a receive path adapted to receive a receive signal, an analog interference cancellation circuit coupled to the transmit path and adapted to remove a first portion of a self-interference signal from the receive signal, and a controller. The analog cancellation circuit includes, in part, a multitude of delay paths each including a delay element and a variable attenuator. The controller is adapted to dynamically vary the attenuation value applied to each of the multitude of variable attenuators in accordance with a frequency response characteristics of the attenuators.

In one embodiment, the wireless communication further includes, in part, a memory adapted to store at least one frequency response characteristic associated with at least one attenuation value of each of the multitude of the variable attenuators. In one embodiment, the controller is adapted to generate a multitude of attenuation values for each of the multitude of variable attenuators in accordance with an S parameter associated with that variable attenuator. In one embodiment, the wireless communication system is further adapted to measure a frequency response characteristics of a channel through which the transmit signal is transmitted using at least a first preamble symbol. The controller is further adapted to dynamically vary the attenuation value of each of the multitude of variable attenuators in accordance with the frequency response characteristic of the channel. In one embodiment, the first preamble symbol is a WiFi preamble symbol.

In one embodiment, the wireless communication system is further adapted to measure the frequency response characteristic of the transmit channel using at least a second preamble symbol. In one embodiment, the wireless communication is further adapted to measure a frequency response characteristic of each one of the attenuators while setting an attenuation value of each of the remaining attenuators to a maximum value. In one embodiment, the wireless communication system is further adapted to apply a least square fit to the measured frequency response characteristics of the attenuators.

In one embodiment, the controller is further adapted to dynamically vary the attenuation value applied to each of the variable attenuators by minimizing a difference between a first matrix defined by the frequency response characteristics of the channel and a second matrix defined by the frequency response characteristics of the delay paths. In one embodiment, the wireless communication system further includes, in part, a digital interference cancellation circuit coupled to the transmit path and adapted to remove a second portion of the self-interference signal from the receive signal. In one embodiment, the digital interference cancellation circuit is disposed in the controller.

A wireless communication system, in accordance with one embodiment of the present invention, includes, in part, a transmit path adapted to transmit a transmit signal, a receive path adapted to receive a receive signal, and a digital interference cancellation circuit coupled to the transmit path and adapted to dynamically remove a first portion of a self-interference signal from the receive signal using samples of a signal that has been transmitted and samples of a signal that has not been transmitted. In one embodiment, the wireless communication system is further adapted to define the frequency response characteristic of a channel through which the transmit signal is transmitted using at least first and second preamble symbols. In one embodiment, the first and second preamble symbols are WiFi preamble symbols.

In one embodiment, the wireless communication system defines the frequency response characteristic of the channel by forming a first matrix whose elements represent samples of the first and second preamble symbols. In one embodiment, the first matrix is a first Toeplitz matrix. In one embodiment, the elements of the first Toeplitz matrix are first order samples of the first and second preamble symbols.

In one embodiment, the digital interference cancellation circuit is adapted to dynamically remove the linear components of the first portion of the self-interference signal from the receive signal by minimizing a difference between a second matrix defined by samples of the receive signal and the first Toeplitz matrix. In one embodiment, the wireless communication system further defines the frequency response characteristic of the channel by forming a third matrix whose elements represent higher than first order samples of the at least first and second preamble symbols. In one embodiment, the third, fifth, and seventh order samples form the higher order samples. In one embodiment, the third matrix is a second Toeplitz matrix.

In one embodiment, the digital interference cancellation circuit is adapted to dynamically remove the nonlinear components of the first portion of the self-interference signal from the receive signal by minimizing a difference between the second matrix and the second Toeplitz matrix. In one embodiment, the wireless communication system further includes, in part, an analog interference cancellation circuit and a controller. The analog interference cancellation circuit is coupled to the transmit path and adapted to remove a second portion of a self-interference signal from the receive signal. The controller is adapted to dynamically vary an attenuation value applied to each of the plurality of variable attenuators. In one embodiment, the digital interference cancellation circuit is disposed in the controller.

A method of operating a wireless communication system, in accordance with one embodiment of the present invention includes, in part, transmitting a transmit signal from a transmit path, receiving a receive signal from a receive path, and dynamically varying an attenuation value applied to each of a multitude of variable attenuators disposed in the wireless communication system in accordance with a frequency response characteristics of the attenuators thereby to remove a first portion of a self-interference signal from the receive signal. In one embodiment, the method further includes, in part, storing in a memory at least one frequency response characteristic associated with at least one attenuation value of each of the plurality of the variable attenuators.

In one embodiment, the method further includes, in part, generating a multitude of attenuation values for each of the of variable attenuators in accordance with an S parameter associated with that variable attenuator. In one embodiment, the method further includes, in part, measuring the frequency response characteristic of a channel through which the transmit signal is transmitted using at least a first preamble symbol, and dynamically varying the attenuation value of each of variable attenuators in accordance with the frequency response characteristics of the channel. In one embodiment, the first preamble symbol is a WiFi preamble symbol.

In one embodiment, the method further includes, in part, measuring the frequency response characteristic of the transmit channel using at least a second preamble symbol. In one embodiment, the method further includes, in part, measuring the frequency response characteristic of each one of the attenuators while setting an attenuation value of each of the remaining attenuators to a maximum value. In one embodiment, the method further includes, in part, applying a least square fit to the multitude of measured frequency response characteristics of the multitude of attenuators.

In one embodiment, the method further includes, in part, dynamically varying an attenuation value applied to each of the variable attenuators by minimizing a difference between a first matrix defined by the frequency response characteristics of the channel and a second matrix defined by the frequency response characteristics of a multitude of delay paths in which the multitude of the attenuators are disposed. In one embodiment, the method further includes, in part, removing a second portion of the self-interference signal from the receive signal using a digital interference cancellation circuit. In one embodiment, the digital interference cancellation circuit is disposed in a processor configured to execute instructions.

A method of operating a wireless communication system, in accordance with one embodiment of the present invention, includes, in part, transmitting a transmit signal from a transmit path, receiving a receive signal from a receive path, and removing a first portion of a self-interference signal from the receive signal using samples of a signal that has been transmitted and samples of a signal that has not been transmitted. In one embodiment, the method further includes, in part, defining the frequency response characteristic of a channel through which the transmit signal is transmitted using at least first and second preamble symbols. In one embodiment, the first and second preamble symbols are WiFi preamble symbols.

The method further includes, in part, defining the frequency response characteristic of the channel by forming a first matrix whose elements represent samples of the first and second preamble symbols. IN one embodiment, the first matrix is a first Toeplitz matrix. In one embodiment, the elements of the first Toeplitz matrix are first order samples of the first and second preamble symbols.

In one embodiment, the method further includes, in part, dynamically removing linear components of the first portion of the self-interference signal from the receive signal by minimizing a difference between a second matrix defined by samples of the receive signal and the first Toeplitz matrix. In one embodiment, the method further includes, in part, defining the frequency response characteristic of the channel by forming a third matrix whose elements represent higher than first order samples of the at least first and second preamble symbols. In one embodiment, the higher order samples are the third, fifth, and seventh order samples of the first and second preamble symbols. In one embodiment, the third matrix is a second Toeplitz matrix.

In one embodiment, the method further includes, in part, dynamically removing nonlinear components of the first portion of the self-interference signal from the receive signal by minimizing a difference between the second matrix and the second Toeplitz matrix. In one embodiment, the method further includes, in part, dynamically varying an attenuation value applied to each of a multitude of variable attenuators thereby to remove a second portion of a self-interference signal from the receive signal. In one embodiment, the method further includes, in part, dynamically varying the attenuation value applied to each of the multitude of variable attenuators using a processor, and removing the first portion of a self-interference signal from the receive signal using the processor.

DETAILED DESCRIPTION OF THE INVENTION

Figure 1:
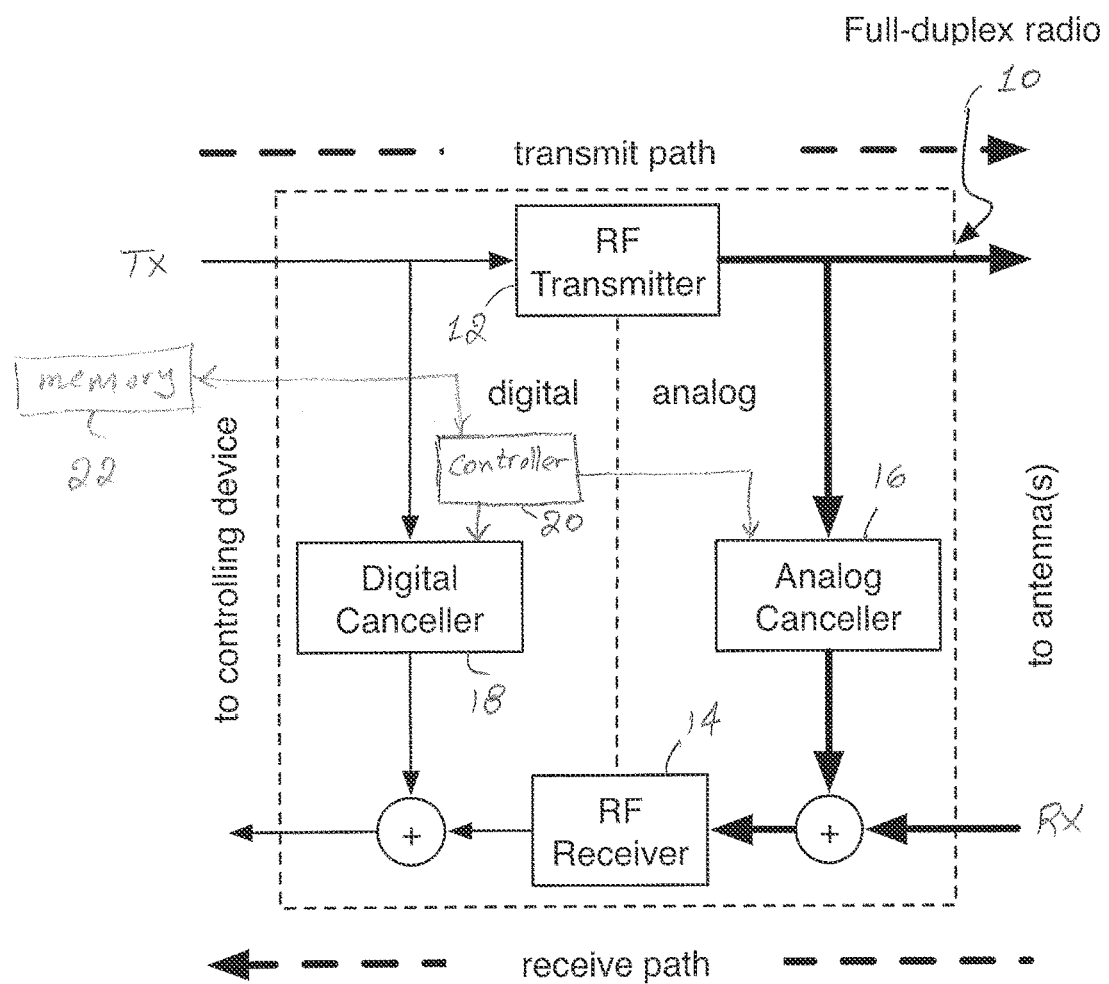
FIG. 1 is a simplified block diagram of a full-duplex wireless communication system, in accordance with one embodiment of the present invention.

Embodiment of the present invention relate processing signals and, in particular, to a full-duplex signal shaping system. The system may include one or more antennas for transmitting and/or receiving signals over a plurality of wireless spectrum fragments and a signal processing layer in communication with the one or more antennas for simultaneously causing reception of the received signal and transmission of the transmitted signal. The signal processing layer may include interference cancellation components for eliminating a portion of interference from the received signal. In some cases, the interference can be caused by the transmitted signal and affect the received signal (i.e. self-interference). The signal processing layer may also include filtering components for removing interference from the received signal. Through use of these components, the full-duplex signal shaping system enables a full-duplex radio to simultaneously transmit and receive signals despite self-interference issues (by reducing the amount of self-interference present in received signals).

In conventional communications systems, simultaneous transmission and reception (even over different bands) cannot typically be achieved without some form of ancillary processing, because the transmitted signal may be substantially stronger than the received signal. For example, when an analog-to-digital converter (ADC) of a full-duplex radio samples an analog receive signal, the ADC converts each sample into a number corresponding to a voltage level. The value of each sampled point can be represented by a fixed length variable, which can have a size determined by the resolution, or dynamic range, of the ADC. If for example, the ADC has a resolution of n bits (e.g., n=12), then the ADC can only hold values from 0 to $2^{(n-1)}$. Because the self-interference can be billions of times stronger than the received signal, the dynamic range of an ADC may not be large enough to acquire the received signal in the face of such large self-interference; the receiver can become saturated and the received signal may be effectively "lost" in quantization. Indeed, in the example case of WiFi™, the self-interference power can be over 60-70 dB greater than the received signal. This saturation can occur even when the transmit signal and receive signal are on different spectrum fragments.

The full-duplex signal shaping system may enable full-duplex communication over arbitrary spectrum fragments, so that simultaneous transmission and reception may occur over different frequency channels (which can be arbitrary; e.g., not specified in advance and varying in time). In some implementations, the full-duplex signal shaping system may utilize a combination of mechanisms (e.g., analog circuitry and digital processing systems) to achieve full-duplex communication over a plurality of spectrum fragments. To prevent receiver saturation, the full-duplex signal shaping system preferably cancels self-interference from received signals. In other words, the self-interference signal can be subtracted from the received signal, so that the self-interference is eliminated, potentially reducing the risk of receiver saturation.

In some implementations, analog circuitry components of the full-duplex signal shaping system reduce self-interference of received signals enough that receiver saturation does not occur. The analog circuitry components may provide analog cancellation based on the use of passive components, the use of balanced-unbalanced transformers (baluns), and/or the use of any other analog circuitry components (e.g., passive/active filters, op-amps, etc).

The analog circuitry components of the full-duplex signal shaping system preferably include programmable passive attenuators and passive delay lines; additionally or alternatively, the analog circuitry components may include any suitable analog signal shaping components/systems, including scaling systems (e.g., attenuators, amplifiers, phase inverters), phase-shifting systems, and/or delay systems (e.g., passive delay lines, active delay lines, etc.). In one implementation, the full-duplex signal shaping system includes a passive programmable attenuator and a simple wire whose length is statically matched roughly to the over-the-air delay for the transmitted signal.

The full-duplex signal shaping system may invert a self-interference cancellation signal (for addition to a receive signal) using a balun; additionally or alternatively, the analog circuitry components may include a subtractor circuit. For example, a balun in a typical operational configuration takes an input signal on the unbalanced tap and produces two output signals that are inverses of each other on the balanced taps. The same operation can be modeled in reverse as taking two inputs on the balanced side and producing the subtraction of the input signals as the signal on the unbalanced side. Hence, if the two inputs of the balun are exact replicas of each other, the output of the balun will be substantially zero.

Self-interference cancellation can thus prevent full-duplex radio receivers from saturating, but by itself, self-interference cancellation may not be sufficient to fully cancel out the interference between bands. However, because analog self-interference cancellation preferably reduces self-interference enough to avoid receiver saturation, digital signal shaping systems may preferably be used by the full-duplex signal shaping system to remove a portion or all of remaining self-interference in the receive signal. Digital signal shaping systems of the full-duplex signal shaping system preferably include a set of programmable digital filters (also referred to as a filter engine) to digitally remove self-interference from the receive signal, but may additionally or alternatively include any suitable digital signal shaping systems. The filter engine can be configured to ensure that the transmitted or received signals are shaped according to, for example, a higher-layer specification defining which spectrum fragments to use for transmission/reception. At the receiver, this can include converting the sampled wideband signal into narrowband streams by down converting and filtering to remove adjacent band interference. The reverse functionality may be used at the transmitter; narrowband baseband streams may be up converted and filtered to prevent aliasing.

The full-duplex signal shaping system preferably includes both an analog self-interference cancellation system and a digital signal shaping system, but may additionally or alternatively include only one of these systems.

In some implementations, the full-duplex signal shaping system may allow simultaneous transmission and reception on separate arbitrary channels that are not specified in advance. The full-duplex signal shaping system may be used in a wide range of radios (e.g., mobile cellular devices, IEEE 802.22 white space devices, IEEE 802.15.4 sensor network nodes) and enable them to operate on different channels of varying bandwidths at different times.

In some implementations, full-duplex signal shaping systems may be used in centralized access points (e.g., cellular base stations or WiFi™ access points) to provide full-duplex signal shaping, enabling the access points to utilize varying amounts of spectrum to support different user numbers. Because the ability to simultaneously transmit and receive across different fragments decouples the use of each fragment from its frequency band, different users may be able to run different applications with varying latency requirements and not substantially affect one another.

In some implementations, the full-duplex signal shaping system can enhance the use of outing protocols (e.g., in wireless mesh networks). Full-duplex operation can reduce latency and the overhead associated with synchronizing all of the nodes to ensure that nodes do not attempt to transmit when they should be receiving a packet. Routing benefits created by full-duplex signal shaping can also be used to aggregate backhaul capacity (e.g., if one backhaul link is overloaded, the node could act as a router and offload the data it cannot support onto a node which has excess backhaul capacity).

Fall-duplex signal shaping may additionally be used in the context of peer-to-peer networks (e.g., WiFi Direct®). Full-duplex signal shaping may enable one node to transmit to another node while receiving from that node (or a third node). Full-duplex signal shaping may enable different peer-to-peer connections to operate independently and reduce the overhead associated with sending out beacons to announce availability to receive. Full-duplex signal shaping may also obviate the need for synchronized transmission and/or reception scheduling.

In some implementations, the full-duplex signal shaping system may provide self-interference cancellation to enable simultaneous transmission and reception on different bands. For example, the full-duplex signal shaping system may include an analog self-interference cancellation coupled to a single antenna utilizing a circulator (or isolator, duplexer, etc.) to separate out the transmit and receive signals. It can also involve more than two antennas (e.g., 3 antennas, such as 2 transmit, 1 receive, where the 2 transmit antennas can be placed half of a wavelength apart from one another). The full-duplex signal shaping system may additionally or alternatively include a digital cancellation system implementing filters; e.g., Butterworth, Chebyshev, FIR, IIR, etc.

Many everyday devices, e.g., mobile phones, wireless local area networks ("LANs"), Bluetooth® enabled devices, ZigBee® small low-power digital radios, global positioning systems ("GPS"), two-way radios such as Land Mobile, FRS and GMRS radios, operate in a ultra-high frequency (UHF) communication spectrum of 300-3000 MHz. Given the types of devices that operate in this band, this spectrum can become increasingly fragmented. The most common operational frequency for these devices is approximately 2.4 GHz, where these devices operate in an Industrial, Scientific, and Medical ("ISM") radio band. In the unlicensed ISM band, each device may operate in its own contiguous narrow band of varying widths. This can lead to fragmentation of the 2.4 GHz ISM band into various chunks (e.g., 100 MHz chunks). Spectrum fragmentation can vary over time and space, as the set of available ISM bands can depend on which devices are operating at a particular location at any given time.

FIG. 1 is a block diagram of an exemplary full-duplex radio 10, in accordance with one embodiment of the present invention. Full-duplex radio 10 is shown as including, in part, an RF transmitter 12, an RF receiver 14, an analog self-interference cancellation block 14, and a digital self-interference cancellation block 18. Full-duplex radio is also shown as including a controller 20 for controlling operations of analog self-interference cancellation block 14 and digital self-interference cancellation block 18, and for accessing and executing program code stored in memory 22. One or more antennas may be used for signal transmission and reception. The full-duplex radio 10 may include components such as filters, converters (e.g., digital-to-analog converters and the like), mappers, signal shaping components, Fast Fourier Transform ("FFT") modules, etc., to generate signals for transmission via one or more downlinks and reception via one or more uplinks. In some implementations, the full-duplex radio 10 is compatible with one or more of WiFi™, Bluetooth®, GSM EDGE Radio Access Network ("GERAN"), Universal Terrestrial Radio Access Network ("UTRAN"), and Evolved Universal Terrestrial Radio Access Network ("E-UTRAN"); the full-duplex radio 10 may additionally or alternatively be compatible with any other suitable standards. The full-duplex radio 10 can be configured to perform one or more aspects of the subject matter described herein. Although not shown, in one embodiment, a processor/computer or computer system may be programmed to perform the operations of and thus be used in place of controller 20 and digital canceller 18.

Many conventional devices operate on contiguous spectrum bands and are therefore unable to take advantage of fragmented spectra. Some conventional devices include modified physical layers ("PHY") and media access control ("MAC") layers (also referred to as higher layers) so that they can operate on fragmented spectra. Such modifications may include the use of a wideband orthogonal frequency division multiplexing ("OFDM") PHY layer that uses only subcarriers that are in the empty spectrum fragments and a modified MAC layer to ensure that all available spectrum fragments are utilized fully. However, because conventional radios cannot transmit and receive simultaneously over arbitrary different bands, these devices cannot exploit fragmented spectrum without significant complexity and reductions in performance. As more conventional devices connect to a network, complexity of such distributed coordination grows, leading to inefficient spectrum utilization.

Functionalities of a communications system are governed by the Open Systems Interconnection ("OSI") model (ISO/IEC 7498-1), whereby functions of the communications system are grouped in terms of abstraction layers. There are seven layers in the OSI model, which include:
  a physical layer (PHY) that defines electrical and physical specifications for devices (e.g., it defines the relationship between a device and a transmission medium),
  a data link layer that provides functional and procedural means to transfer data between network entities and to detect and correct errors that occur in the physical layer (e.g., it can include the following functionalities/sublayers: framing, physical addressing, flow control, error control, access control, and media access control (MAC)),
  a network layer that provides functional and procedural means of transferring variable length data sequences from a source host on one network to a destination host on a different network while maintaining the quality of service requested by the transport layer,
  a transport layer that provides transparent transfer of data between end users, thereby providing reliable data transfer services to the upper layers,
  a session layer that controls connections between computers, establishes, manages and terminates connections between local and remote applications, provides for full-duplex half-duplex, or simplex operation, and establishes checkpointing, adjournment, termination, and restart procedures,
  a presentation layer that establishes context between application-lay entities, in which the higher-layer entities use different syntax and semantics if the presentation service provides a mapping between them, and
  an application layer, which is the OSI layer closest to the end user, whereby the OSI application layer and the user interact directly with the software application.

Figure 2:
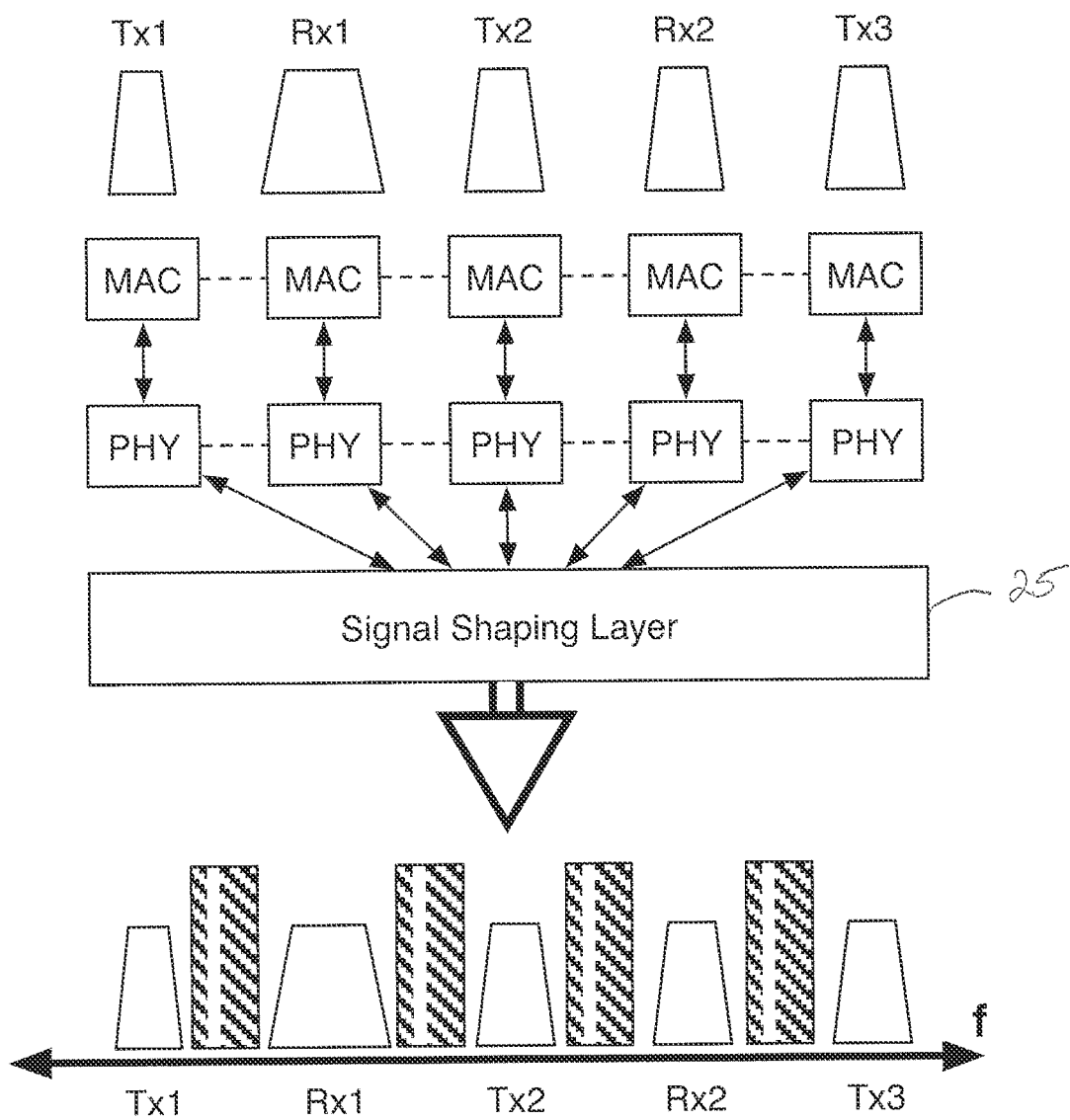
FIG. 2 shows an exemplary full-duplex signal shaping system adapted to be used with PHY and MAC layers of a wireless communications device, in accordance with one embodiment of the present invention.

FIG. 2 shows an exemplary implementation of a full-duplex signal shaping system 25 (implemented as a signal shaping layer) that may be used with PHY and MAC layers of a wireless communications device to enable the use of fragmented spectrum. Full-duplex signal shaping may include transmitting on an arbitrary set of spectrum fragments of the wireless spectrum and receiving on a different arbitrary set of spectrum fragments of the wireless spectrum. Transmission and reception may be performed simultaneously or separately in time. Through use of full-duplex signal shaping, the full-duplex radio may decouple use of different spectrum fragments; instead of having one complex wideband PHY and MAC protocol that operates over the entire fragmented spectrum, the system can run several independent, contiguous narrowband PHY and MAC instances on each spectrum fragment. Hence, full-duplex signal shaping may aid in preserving design modularity and enabling reuse of higher layers of a communication system.

The full-duplex signal shaping system (and methods for full-duplex signal shaping) may be used in communication devices. Exemplary communication devices may include receiver circuitry that can receive signals transmitted by another communication device, transmitter circuitry that can transmit signals for reception by another communication device, and various processing circuitry that can process received signals, prepare signals for transmission, and/or perform various other functions. Exemplary communication devices may include a mobile telephone, a Bluetooth® enabled device, a ZigBee® small low-power digital radio, a GPS device, a two-way radio, such as Land Mobile, Family Radio Service ("FRS") and General Mobile Radio Service "GMRS") radios, and/or any other devices. The full-duplex signal shaping system can perform at least one of the following functions: full-duplex operation and dynamic signal shaping. The following is a brief discussion of each of these functions.

In some implementations, during full-duplex operation, a full duplex radio of a preferred embodiment may allow higher layers (e.g., PHY, MAC, etc.) of the communication device to simultaneously transmit and receive on arbitrary but different sets of spectrum fragments of the wireless spectrum. Through full-duplex signal shaping, the full-duplex radio may reduce receiver saturation during such simultaneous receive/transmit operations.

In some implementations, a full-duplex signal shaping system may include a programmable digital filter to shape signals in order to fit available spectrum fragments across a frequency band of interest. This can allow for efficient operation given the dynamic nature of the available spectrum fragments as well as their ability to change over time.

In some implementations, a full-duplex signal shaping system may include a self-interference cancellation mechanism that can reduce an amount of self-interference and reduce the risk of saturation of an analog-to-digital converter in the receive circuitry of a full-duplex radio. The self-interference cancellation mechanism preferably does not leak interference into adjacent band or otherwise negatively affect receive performance. The self-interference cancellation mechanism preferably includes a reconfigurable filter engine that can provide efficient and programmable digital filtering.

Figure 3:
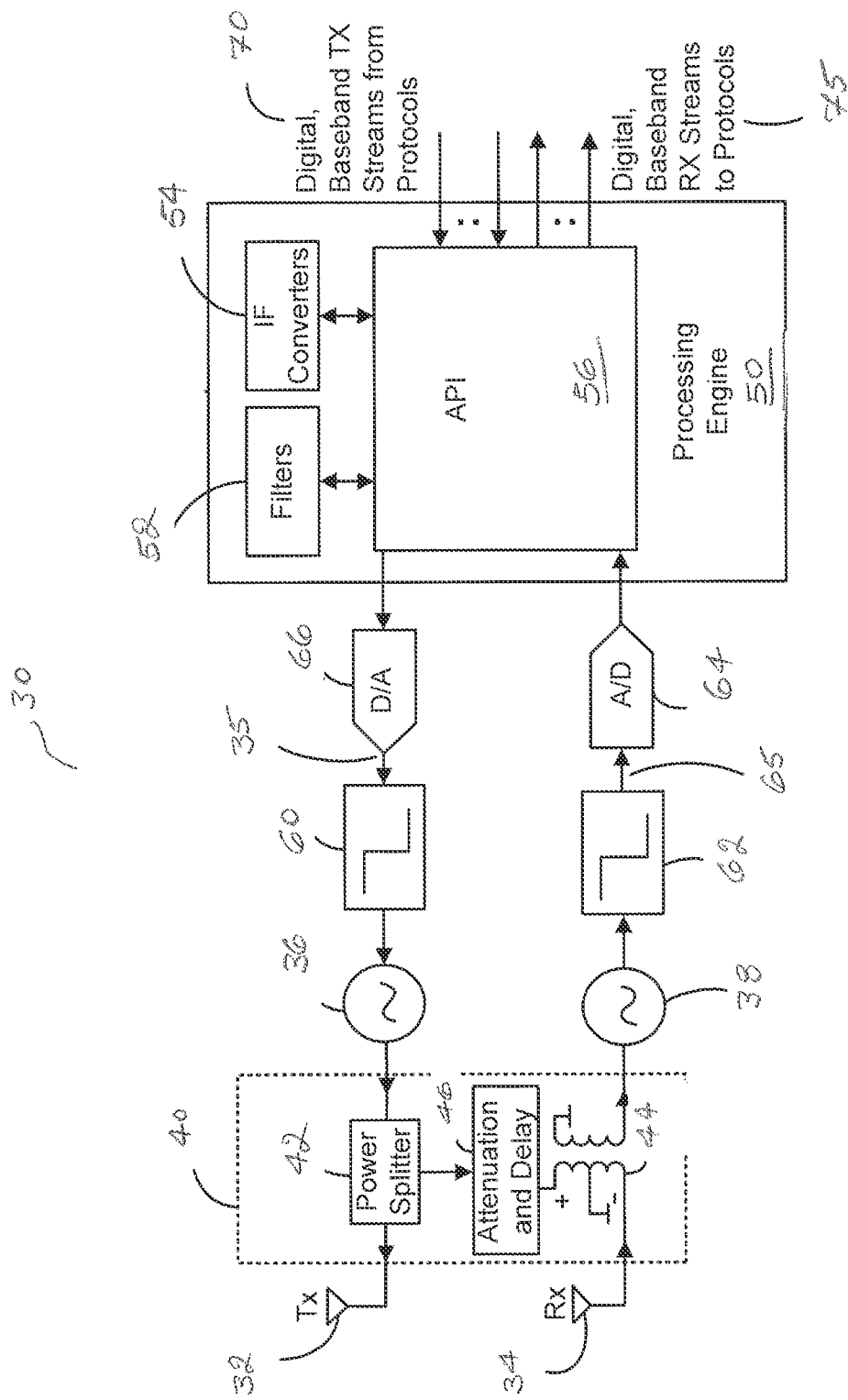
FIG. 3 is a simplified block diagram of a full-duplex wireless communication system, in accordance with another embodiment of the present invention.

FIG. 3 is a block diagram of a full-duplex signal shaping system 30, in accordance with one embodiment of the present invention. Full-duplex signal shaping radio 30 is shown as including, in part, an analog self-interference cancellation block 40 and a digital processing engine (alternatively referred to herein as digital filter engine) 50 adapted to perform digital self-interference cancellation. In one embodiment, system 30 includes a receiver antenna or component ("Rx") 34 and a transmitter antenna or component ("Tx") 32. Alternatively, system 30 may include a single antenna connected to the Rx and Tx antennas 34 and 32 through a duplexer or isolator. Although not shown, system 30 may also include additional antennas. In some embodiment, system 30 may include only one of the analog cancellation block 40 and digital filter engine 50. The analog self-interference cancellation block 40 is shown as including a power splitter 42 that can include a high power port and a low power port, where the high power port of the power splitter may be coupled to the transmitter antenna (or component) 32 and the low power port may be coupled to attenuation (scaling) and delay circuitry 46. Attenuation and delay circuit 46 is adapted to attenuate (scale) and/or delay transmit signals, the combination of which can be used as a self-interference cancellation signal. The power splitter 42 may be a passive device that couples a defined amount of the electromagnetic power in a transmission line to a port enabling the signal to be used in another circuit. The power splitter 42 can couple power flowing in one direction, whereby power entering the output port can be coupled to an isolated port but not to the coupled port. The power splitter 42 may additionally or alternatively be any other suitable type of power splitter or coupler, including an active power splitter, or a power splitter that distributes power evenly among output ports. For example, the power splitter 42 may be an 8 dB power splitter that can be used to obtain a reference signal and reduce the transmit power by 8 dB.

The attenuation and delay circuitry 46 is shown as being coupled to a balun transformer 44. Balun transformer 44 may convert between a balanced signal (two signals working against each other, where ground is irrelevant) and an unbalanced signal (a single signal working against a ground or a pseudo-ground). A balun can take many forms and can include devices that transform impedances but need not do so. Balun 114 may be used as a subtractor circuit, where the transmitted signal does not suffer a substantial power loss. This is distinct from baluns used as inverters, which results in a larger power loss (e.g., 3 dB power loss). In systems using baluns as inverters, the transmit antenna transmits a positive signal and to cancel self-interference, the radio combines a negative signal with its received signal after adjusting the delay and attenuation of the negative signal to match the self-interference.

The digital filter engine 50 may include programmable filtering elements which may include various filtering structures 52 and intermediate frequency converters 54. The digital filter engine 50 may also include a filter engine application programming interface ("API") 56.

The analog self-interference cancellation block 40 is shown as being coupled to the digital filter engine 50 via at least one receive path 65 and at least one transmit path 35. The receive path is shown as being coupled to the receive antenna (or component) 34 via balun transformer 44. System 30 is adapted to process a received radio frequency (RF) signal through a frequency converter 38 that converts the received RF signal to a baseband signal. The baseband signal may then be filtered through a low-pass filter 62 and passed onto an analog-to-digital converter (ADC) 64. The ADC 64 may sample the received signal at a predetermined sampling frequency and pass it to the digital filter engine 50. The digital filter engine 50 may filter and/or otherwise transform the signal to further remove self-interference and output it as digital baseband Rx signal to protocol layers. The transmit path 35 is shown as being coupled to the transmit antenna/component 32 via the power splitter 42 and is adapted to perform functions similar to those performed during signal processing on the receive path 65. The digital filter engine 50 can pass a filtered digital baseband Tx signal from protocol layers to a digital-to-analog converter (DAC) 66. The DAC 66 may resample the signal and pass it to a low pass filter 60, which may then apply it to a frequency converter 36 to generate a transmission RF signal from the baseband signal for transmission by the transmit antenna/component 32.

System 30 achieves full-duplex operation over different but arbitrary spectrum fragments by cancelling self-interference present in analog receive signals instead of simply filtering it. The self-interference signal can be subtracted from the received signal, reducing the effect of self-interference on the received signal and avoiding receiver saturation. Self-interference subtraction is accomplished, in part, using the balun transformer 44. System 30 is adapted to determine the amount of cancellation needed to reduce the risk of receiver saturation. System 30 determines the threshold cancellation value based on at least one of the dynamic range of the ADC 64 and the range of expected signal strengths.

Dynamic range ("DR") is defined as the ratio between largest and smallest possible values of a variable of interest. At the transmitter, the dynamic range of the DAC can determine the maximum ratio between the powers of the strongest and weakest transmissions. At the receiver, the ADC's dynamic range can define the maximum ratio between the strongest and weakest received signal power. When the dynamic range is exceeded, the converter's quantization noise can bury weaker signals. The dynamic range of the ADC can be calculated through the following expression:

$$DR(dB) = 6.02n + 1.76$$

where n is the resolution of the ADC (in bits). Higher dynamic ranges may increase ADC performance. Some embodiments of system 100 use 12-bit DACs/ADCs, providing approximately 74 dB of dynamic range.

At the transmitter, the maximum ratio of transmit powers across different fragments will rarely exceed, for example, 30 dB, so DAC dynamic range is usually not a concern. On the other hand, if the transmitter is operating while the system attempts to receive, the dynamic range of the ADC at the receiver can be critical because the transmitted signal may be much stronger than the received signal. To estimate the required ADC dynamic range, the range of expected signal strengths can be calculated. Assuming that the transmit and receive antennas are reasonably separated, the attenuation between the two due to path loss can be calculated as follows:

$$\text{Path Loss(dB)} = 36.56 + 20 \log_{10} f + 20 \log_{10} d$$

where f is the carrier frequency in MHz and d is the distance in miles. Assuming that the transmit and receive antennas are separated by 10 cm, the path loss between transmitter and receiver is approximately, for example, 23 dB; a maximum output from a WiFi 2.4 GHz antenna is approximately 23 dBm. Because a typical thermal noise-floor for WiFi systems is approximately 95 dBm, for example, the power of the weakest decodable signal is −90 dBm (according to IEEE 802.11 standard, the lowest signal-to-noise ratio is approximately 5 dB).

Based on these calculations, the estimated amplitude of the self-interference signal at the receiver is 0 dBm, assuming 23 dBm transmit power, the maximum in WiFi. Thus, ADC 64 may require, for example, 90 dB in dynamic range in order to simultaneously transmit and receive. Relatedly, it is expected that the amount of cancellation required is negatively correlated to ADC resolution.

In some implementations, to avoid interference leakage, passive components that do not introduce distortion may be used in system 30. System 30 can provide for cancellation of a certain amount of signal power (e.g., 20-25 dB of cancellation compared to the 35 dB required for single-channel full-duplex). Hence, precise delay matching with the over-the-air transmitted signal may not be needed. Further, as stated above, the balun transformer can be used as a subtractor circuit, as shown in FIG. 3.

While the analog self-interference cancellation block 40 is adapted to prevent the receiver ADC 64 from saturating, it may be insufficient for fully cancelling out the interference between bands. However, with the ADC dynamic range not saturated, system 30 can utilize programmable digital filters of the digital filter engine 50 to digitally remove the remaining self-interference from the received signal, programmatically shaping the received and/or transmitted signals.

The digital filter engine 50 is adapted to enable the transmitted and/or received signals to be shaped according to the higher layer specification of which spectrum fragments to use. At the receiver side, the sampled wideband signal can be converted into narrowband streams by down-converting and filtering to remove adjacent band interference. The reverse functionality can be performed at the transmitter side, where narrowband baseband streams can be up-converted and filtered to prevent aliasing (i.e., an effect that causes different signals to become indistinguishable (or aliases of one another) when sampled.

The digital filter engine 50 may include the ADC 64 and DAC 64, both of which are adapted to operate at a predetermined Nyquist rate (e.g., the required Nyquist rate to create signals that span the entire 100 MHz ISM band). Further, on the analog RF side, system 30 may include an oscillator running at, for example, 2.45 GHz that can up-convert the shaped signal to the ISM band. There may additionally or alternatively be more than one oscillator at any frequency or distribution of frequencies. The digital filter engine 50 may perform the following tasks to shape the signals for transmission: resampling, filtering, and mapping of signal streams.

For resampling, since the DAC 66 may receive an input signal at the predetermined Nyquist rate (e.g., 200 MS/s), the digital baseband transmission streams 70 can be up-sampled (e.g., 40 Msamples/sec streams can be up-sampled to 200 Msamples/sec). To accomplish this, the up-sampler can interpolate (i.e., insert extra samples) to reach the predetermined Nyquist rate (e.g., 200 MS/s).

The digital filter engine 50 may low-pass filter both up-sampled streams to remove any undesirable aliasing effects generated by the resampling and retain only the up-sampled-baseband version of each stream.

Subsequent to resampling and filtering, the digital filter engine 50 may perform a mapping operation. For example, the filter engine 50 may process two 200 MS/s streams each occupying 20 MHz at a center frequency. The filter engine may move the 20 MHz frequencies to the specified fragments in the 100 MHz band, i.e., to −38 MHz and 22 MHz, respectively (corresponding to 2.412 GHz and 2.472 GHz at a center frequency of 2.45 GHz). The signal streams can be added together and sent to the DAC 66. After that, the signal streams can be up-converted to the carrier frequency of 2.45 GHz and transmitted over the air.

As stated above, the filter engine 50 can include filter structures 52, intermediate frequency converters 54, and filter engine application programming interface ("API") 56. The filter structures 52 can include a collection of configurable programmable filters. The filters may include at least one of the following: a finite impulse response (FIR) filter, an infinite impulse response (IIR) filter, a resampling filter, and/or any other suitable filters. The filters in the filter structures 52 may be configured and sequenced to provide resampling and filtering functionalities discussed above. The intermediate frequency converters 54 can map the signal from an incoming digital baseband 70 to a digital intermediate frequency (IF), and provide mapping functionality.

The filter engine API 56 may act as a substrate enabling programmable interconnection of the filter structures 52 and the IF converter 54 to obtain the desired signal shaping. The API4 56 may configure the filters, up/down samplers, and digital up-/down-converters. It may also coordinate movement of signal streams across these elements. It may additionally or alternatively collect all of the input signal streams 70, add them, and send the final stream to the DAC 66. The analog output of the DAC 66 can be upconverted to a higher frequency (e.g. 2.45 GHz) and transmitted by the transmission antenna/component 32. For receiving shaped signals, the API 54 can perform the above process but in a reverse manner. Thus, by performing the above operations, system 30's analog self-interference cancellation block 40 and the filtering engine 50 can perform full-duplex signal shaping.

System 30 may be implemented as part of a full-duplex radio, but may additionally or alternatively be implemented in a stand-alone device, in a communications network, and/or in any other suitable system or network.

Figure 4:
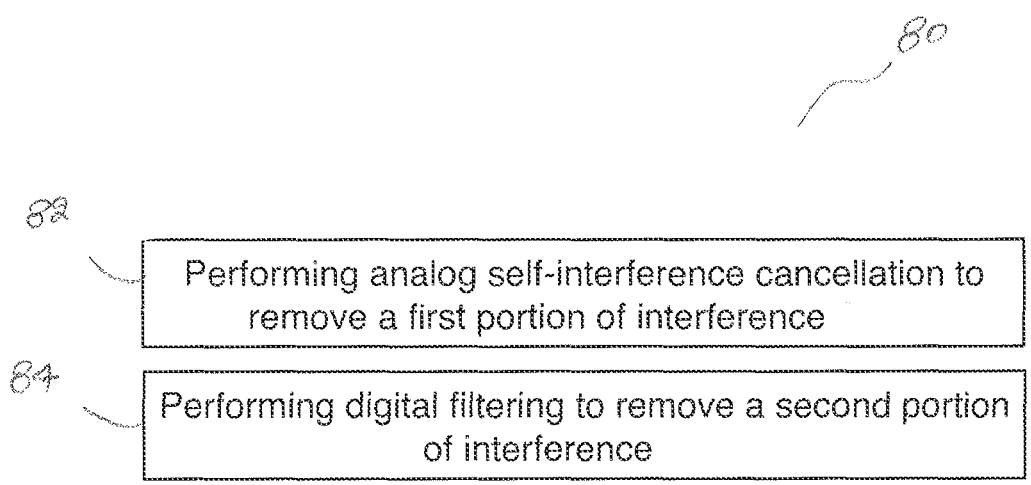
FIG. 4 is a flowchart for cancelling a self-interference signal, in accordance with one embodiment of the present invention.

FIG. 4 is a flowchart 80 for performing full-duplex signal shaping so as to achieve analog self-interference cancellation, in accordance with one embodiment of the present invention. At 82, a first portion of interference from the received signal is removed or cancelled. Interference may be caused by the transmitted signal and affect the received signal (i.e., interference may comprise self-interference). Such interference may be cancelled using the analog self-interference cancellation block 40 shown in FIG. 3 or any other suitable interference-cancelling system. As discussed above, the interference cancellation component can include a balun transformer that can subtract a certain amount of power for the signal to reduce interference. The amount of power to be removed and/or cancelled may be determined based on a various characteristics associated with the transceiver as well as the received/transmitted signals.

At 84, a second portion of the interference is removed from the received signal. This may be achieved using the filtering engine 50 shown in FIG. 3 or any other digital self-interference cancellation circuit. In some implementations, the portion of the interference to be cancelled may be set by a power threshold (which specifies how much power is to be removed from the received signal). The power threshold may be determined based on at least one of the following: dynamic range of at least one of the received and transmitted signals, and a range of expected signal strength. The dynamic range of the received signal may be determined based on a ratio of powers of a strongest received signal and a weakest received signal. The dynamic range of the transmitted signal may be determined based on a ratio of powers of a strongest transmitted signal and a weakest transmitted signal. The range of expected signal strength may be determined based on a distance separating the transmitting antenna and a receiving antenna.

In some implementations, the filtering operation may include performing at least one of the following operations: sampling of the received signal, down-converting the sampled received signal into a narrowband stream, and filtering the down-converted signal to remove the second portion of the interference. Filtering operation may also include performing at least one of the following operations: up-converting the transmitted signal and filtering the up-converted signal to prevent aliasing of the transmitted signal with at least another signal. Filtering may achieved using a finite impulse response filter, an infinite impulse response filter, a resampling filter, or otherwise. In some embodiments, the filtering may include mapping at least one signal received from at least one communication protocol layer to at least one frequency fragment in a wireless frequency band for transmission by the transmitting antenna.

Figure 5:
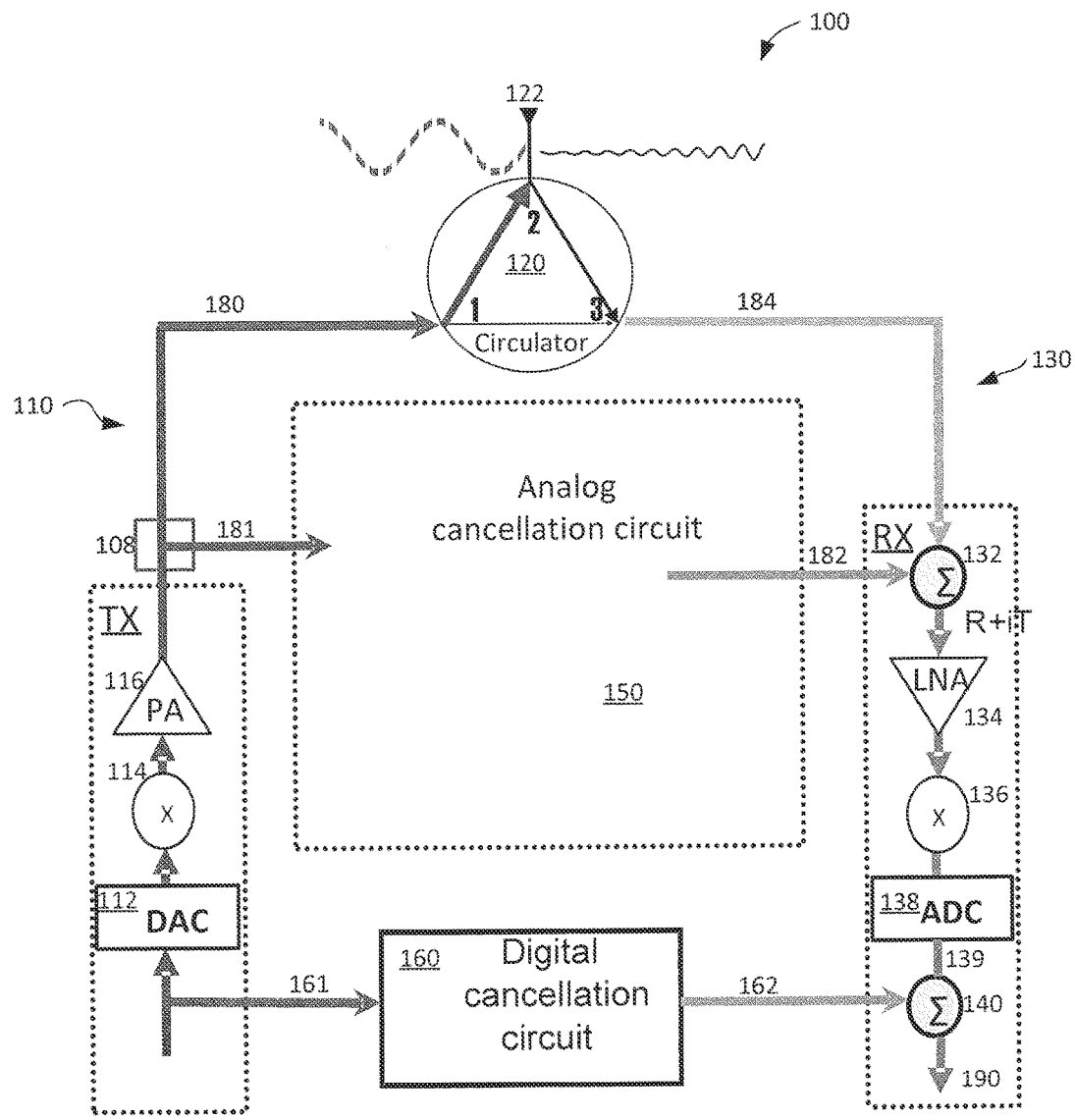
FIG. 5 is a simplified block diagram of a full-duplex wireless communication system, in accordance with another embodiment of the present invention.

FIG. 5 is a simplified block diagram of a full-duplex wireless communication system 100, in accordance with one exemplary embodiment of the present invention. Wireless communication system 100 may be a multiple-access system capable of supporting communication with multiple users by sharing the available system resources. Examples of such wireless systems include code division multiple access (CDMA) systems, time division multiple access (TDMA) systems, frequency division multiple access (FDMA) systems, Long Term Evolution (LTE) systems, orthogonal frequency division multiple access (OFDMA) systems, or the like. Wireless communication system 100 (herein alternatively referred to as system) may be a cellular phone, a base station, an access point, or the like.

Wireless communication system 100 is shown, as including, in part, a transmit path 110, a receive path 130, an analog cancellation circuit 150, a digital cancellation circuit 160, and a circulator 120 adapted to isolate the receive path from the transmission path. Ports 1 and 3 of circulator 120 are shown as being respectively coupled to the transmit path 110 and receive path 130. Receive path 130 is further shown as including, in part, a combiner 132, a low-noise amplifier (LNA) 132, a frequency down-converter 136, an analog-to-digital converter ADC 138, and a combiner 140. Transmit path 110 is shown as including a digital-to-analog converter (DAC) 112, a frequency upconverter 114, and a power amplifier (PA) 116. A power splitter 108 is adapted to split and deliver a first portion of the transmit signal 180 to antenna 122 via circulator 120, and a second portion of the transmit signal 181 to analog cancellation circuit 150. Power splitter 108 may be a passive component. In one embodiment, digital cancellation circuit 160 may be a processor/computer or computer system.

As shown, DAC 112 is adapted to convert the digital baseband transmit signal to an analog signal and deliver the converted analog signal to frequency upconverter 114. A filter (not shown) may be coupled to DAC 112 for filtering the analog signal. The filer may be a surface acoustic wave (SAW) filter or otherwise. Frequency upconverter 114 upconverts the frequency of the received signal to that of an RF signal and delivers the frequency upconverted signal to PA 116. A first portion of output signal 180 of PA 116 is delivered to antenna 122 via circulator 122 for radio transmission, and a second portion of output signal 181 of PA 116 is delivered to analog cancellation circuit 150.

As described further below, combiner 132 subtracts signal 182—generated by analog cancellation circuit 150—from signal 184 that is received by antenna 122 and delivered to receive path 130 via circulator 120. Combiner 132 delivers the resulting signal to LNA 134 which is adapted to amplify and deliver the amplified signal to frequency downconverter 136. Frequency downconverter 136 is adapted to downconvert the frequency of the signal it receives to a baseband or an intermediate frequency and deliver the frequency downconverted signal to ADC 138. In response, ADC converts the analog signal it receives to a digital signal and delivers this signal to combiner 140. As is also further described below, combiner 140 subtracts signal 162—generated by digital cancellation circuit 160—from the output signal 139 of ADC 138 to generate output signal 190 which is representative of the desired receive signal received by antenna 122.

Signal 184 received at port 3 of circulator 120 includes the desired receive signal as well as a portion of transmit signal 180 leaking from port 1 to port 3 of circulator 120. Circulator 120 provides isolation between its ports 1 and 3 and thus reduces the self-interference signal leaking to the receive path by, for example, 15 dB. Analog cancellation circuit 150—disposed between the transmit path 110 and receive path 130—further reduces the self-interference signal, thus preventing LNA 134 from being otherwise saturated by the transmit signal leaking into the receive path. To achieve this, analog cancellation circuit 150 is adapted to generate signal 182—which is representative of the self-interference signal—and deliver signal 182 to combiner 132. In response, combiner 132 subtracts signal 182 from the received signal 184 thereby to reduce (e.g. by 50 dB) the self-interference signal in the receive path. To further reduce the self-interference signal from the receive signal, digital cancellation circuit 160 is adapted to generate and deliver to combiner 140 signal 162 from the baseband transmit signal. In response, combiner 140 subtracts signal 162 from signal 139 thereby to remove (e.g. by 50 dB) the remaining portion of the self-interference signal in the receive path. Digital cancellation circuit 160 may be implemented in hardware, software or any combination thereof, such a central processing unit or any other digital processor.

Figure 6:
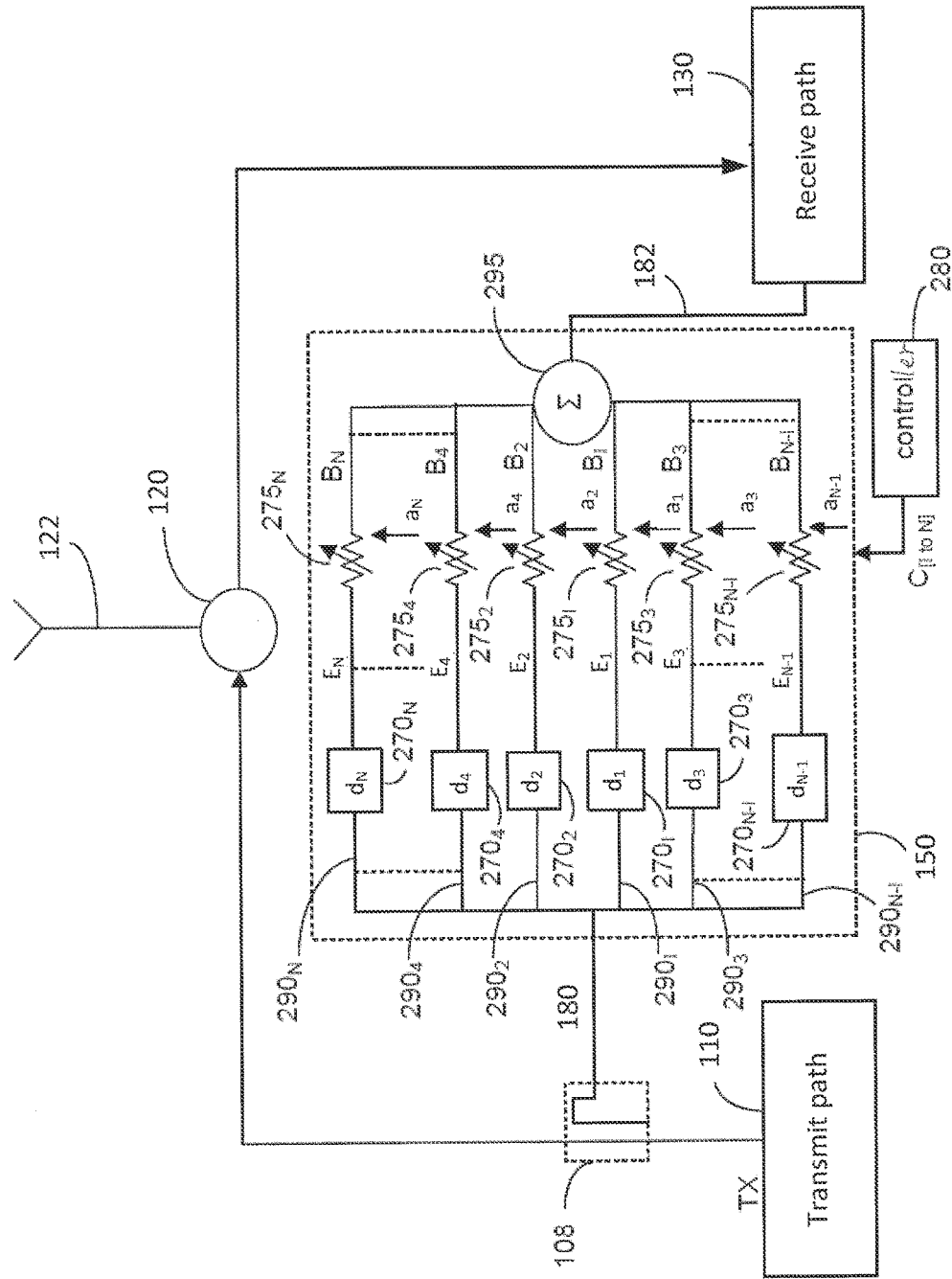
FIG. 6 is a simplified schematic diagram of an analog self-interference cancellation circuit, in accordance with another embodiment of the present invention.

FIG. 6 is a simplified block diagram of an exemplary analog cancellation circuit 150, in communication with a transmit path 110 and a receive path 130. Antenna 122 is coupled to both the receive and transmit paths via circulator 120. As described above, a portion of the transmit signal leaks into and is present in the receive signal in the form of a self-interference signal. Cancellation circuit 150 is adapted to generate a signal 182 that represents the self-interference signal. The self-interference signal 182 is subtracted from the received signal 184 in receive path 130, as described above in reference to FIG. 5.

As shown, cancellation circuit 150 receives a sample 180 of the transmit signal via signal splitter 108. Cancellation circuit 150 is shown as including a multitude of paths $290_1$, $290_2 \ldots 290_{N-1}$, $290_N$, where N is an integer greater than or equal to 2. Each path is shown as including a delay element $270_i$, where i is an index varying from 1 to N, and a variable attenuator $275_i$. The delay elements $290_i$ may generate a fixed or a variable delay. The level of attenuation of each variable attenuator $270_i$ may be varied in accordance with a predefined algorithm implemented by controller 280. Each delay element $270_i$ is adapted to generate a signal $E_i$ that is a delayed version of signal 180. Each variable attenuator $275_i$ is adapted to attenuate the amplitude of the signal $E_i$ it receives in accordance with the control signal $a_i$ applied thereto by controller 280 so as to generate an attenuated (weighted) signal $B_i$. Accordingly, signals $B_i$ are different delayed and weighted versions of signal 180. Combiner 295 combines signals $B_i$ to generate signal 182 which is representative of the self-interference component of the transmit signal. In one embodiment combiner 295 is an adder adding signals $B_i$ to generate signal 182. In other embodiments, combiner 295 may perform other arithmetic or logic functions on signals $B_i$ to generate signal 182. In one embodiment, a processor/computer may be configured to perform the operations of and thus be used in place of controller 280. In yet another embodiment, a processor/computer may be configured to perform the operations of and thus be used in place of both controller 280 and digital cancellation circuit 160.

As described above, cancellation circuit 150 reconstructs the self-interference signal from the signal values present on paths (alternatively referred to herein as taps) $290_i$. Since both the self-interference signal and the time-delayed, weighted signals $B_i$ present on the taps are samples of the same transmit signal, the reconstruction of the self-interference signal is similar to band-limited interpolation. Furthermore, since only a finite number of taps are available, a windowed interpolation may be used to reconstruct signal 182 representative of the self-interference signal. Therefore, the signal representative of the self-interference signal, in accordance with one embodiment of the present invention, is generated from signals $B_i$ that are delayed and attenuated (weighted) versions of the sampled transmit signal 180.

To generate a signal representative of the self-interference signal, in accordance with one exemplary embodiment, the delays generated in each pair of associated paths (taps) $290_i$ are selected such that the arrival time of the self-interference signal at receive path 130 falls within the difference between these two delays (also referred to herein as the delay window). Accordingly, the delay generated by a first tap in each pair of associated taps $290_i$ is less than the arrival time of the self-interference signal at receive path 130 (referred to herein as $T_{self\_int}$) and the delay generated by a second tap in each pair of associated taps $290_i$ is greater than $T_{self\_int}$. In one embodiment, the center two taps, namely taps $290_1$ and $290_2$, form the first pair of associated taps such that, for example, the delay $TL_1$ generated by delay element $270_1$ is less than $T_{self\_int}$ and the delay $TH_1$ generated by delay element $270_2$ is greater than $T_{self\_int}$. $TL_1$ and $TH_1$ are thus selected to be the closest such delays to $T_{self\_int}$. The next two taps closest to the center taps, namely taps $290_3$ and $290_4$, form the second pair of associated taps such that, for example, the delay $TL_2$ generated by delay element $270_3$ is less than $T_{self\_int}$ and the delay $TH_2$ generated by delay element $270_4$ is greater than $T_{self\_int}$. $TL_2$ is shorter than $TL_1$, and $TH_2$ is longer than $TH_1$, therefore $TL_2$ and $TH_2$ are selected to be the second closest such delays to $T_{self\_int}$. The delay of the remaining pairs of associated taps are similarly selected and thus are not described herein. It is understood that in other embodiments, associated taps may be arranged and selected differently. For example, in another embodiment, taps $290_1$ and $290_4$ may be selected as associated taps and used to form a delay window.

The following description is made with reference to an arrangement according to which the center taps $290_1$ and $290_2$ form the first pair of associated taps, the next two taps $290_3$ and $290_4$ form the second pair of associated taps, the next two taps $290_5$ and $290_6$ form the third pair of associated taps, . . . , and the last two taps $290_{N-1}$ and $290_N$ form the last pair of associated taps, as described above. Furthermore, in the following, the delays and interpolations associated with only 2 pairs of associated taps, namely associated taps $290_1/290_2$ and associated taps $290_3/290_4$ are described. It is understood, however, that similar operations may be performed for all other taps regardless of the number of taps disposed in attenuation and delay circuit 120.

Figure 7:
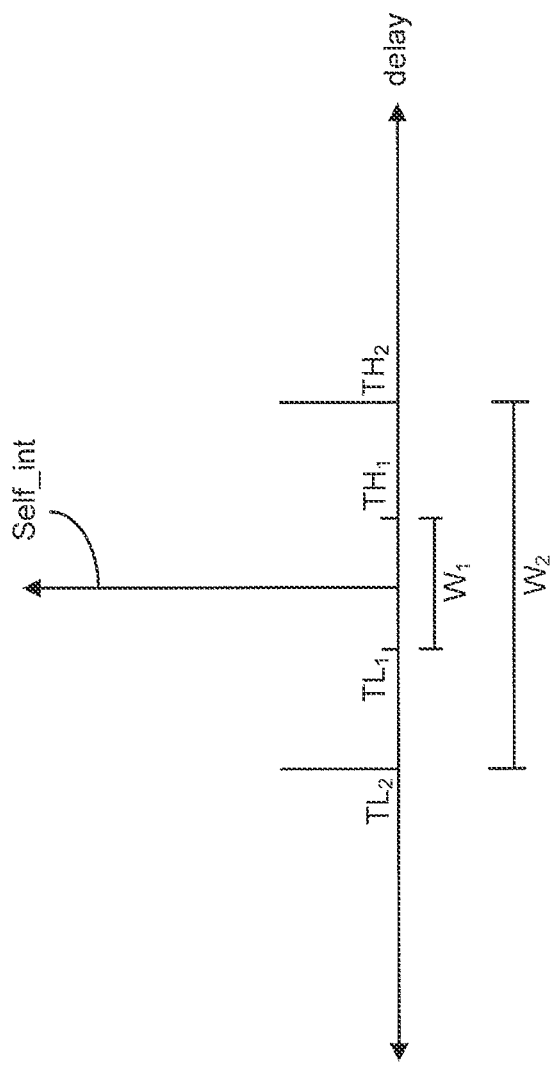
FIG. 7 shows exemplary arrival times of a number of delayed and attenuated signals generated by the analog self-interference cancellation circuit of FIG. 6 relative to that of the self-interference signal.

As shown in FIG. 7, $TL_1$ represents the time around which signal $B_1$ is generated (the delays across attenuators $275_i$ are assumed to be negligible relative to the delays across delay elements $270_i$), $TH_1$ represents the time around which signal $B_2$ is generated, $TL_2$ represents the time around which signal $B_3$ is generated, and $TH_2$ represents the time around which signal $B_4$ is generated. As is seen, time delays $TH_1$ and $TL_1$ are selected (using delay elements $270_1$ and $270_2$) such that $T_{self\_int}$ falls within the window $W_1$ defined by the difference $TH_1$-$TL_1$. Likewise, time delays $TH_2$ and $TL_2$ are selected such that $T_{self\_int}$ falls within the window $W_2$ defined by the difference $TH_2$-$TL_2$. Accordingly, as described above, for each pair of associated taps defining a window, the amount of delay generated by one of the delay paths is longer than $T_{self\_int}$, and the amount of delay generated by the other one of the delay paths is shorter than $T_{self\_int}$. For example, referring to window $W_1$, $TH_1$ is greater than $T_{self\_int}$ and $TL_1$ is smaller than $T_{self\_int}$. Although the above description is made with reference to paths $290_1$, $290_2$, $290_3$, and $290_4$ only, it is understood that all the tap delays are selected such that $T_{self\_int}$ falls either within a window defined by any pair of associated paths. If the attenuation and delay path 120 includes an odd number of paths (i.e., N is an odd number), (N−1) of the delay path may be used to form associated pairs, as described above. The delay $T_N$ associated with the last remaining delay path (the Nth path) is selected such that $T_{self\_int}$ falls within a time from $T_N$.

Figure 8:
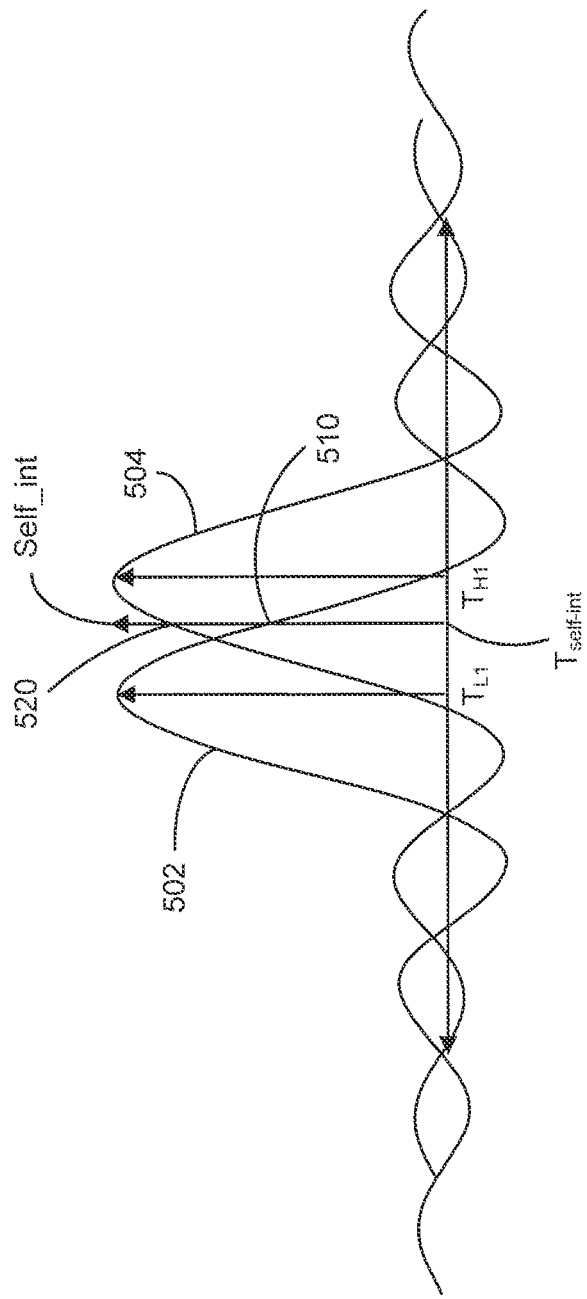
FIG. 8 shows a sinc interpolation process for determine attenuation values applied to a first pair of attenuators of FIG. 6, in accordance with another embodiment of the present invention.
Figure 9:
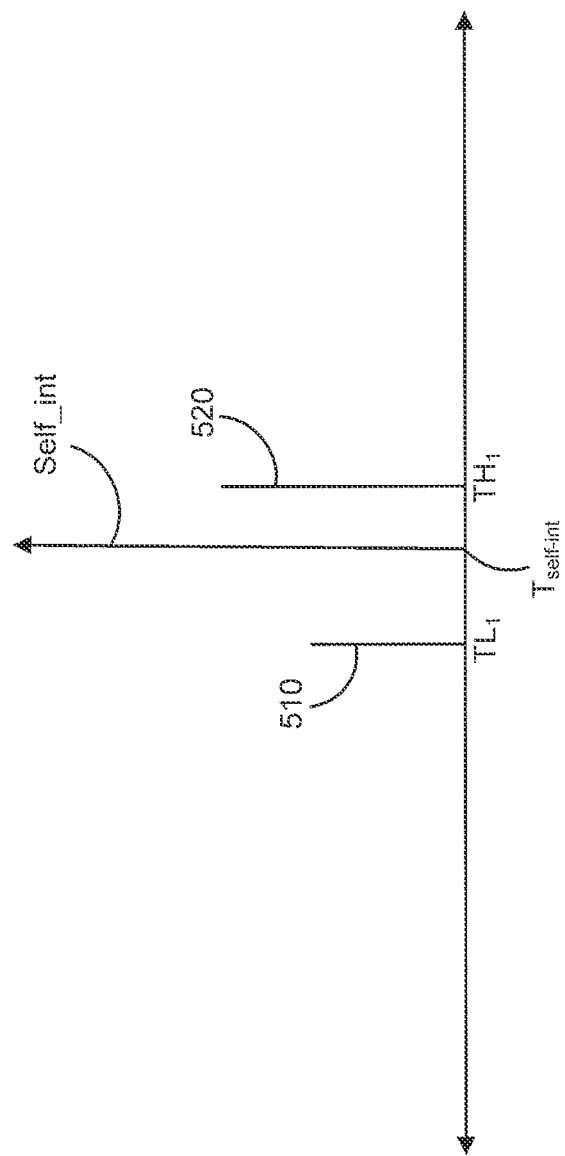
FIG. 9 shows the result of the sinc interpolation process shown in FIG. 8.

To determine the level of attenuation for each attenuator $275_i$, in accordance with one exemplary embodiment of the present invention, sinc interpolation is used; it is however understood that any other interpolation scheme may also be used. To achieve this, for each window, the intersection of a pair of sinc functions—each centered at one of the window boundaries and each having a peak value substantially equal to the peak value of an estimate of the self-interference signal—and the estimate of the interference signal, shown as Self_int, is determined. For example, referring to FIG. 8, sinc function 502 centered at $TL_1$ is seen as intersecting the estimate of the self-interference signal Self_int at point 510, and sinc function 504 centered at $TH_1$ is seen as intersecting signal Self_int at point 520. The heights of points 510 and 520 define the level of attenuations applied to attenuators $275_1$ and $275_2$, respectively. FIG. 9 shows the attenuation levels 510, 520 so determined and applied to attenuators $275_1$ and $275_2$ respectively.

Since the amplitude and delay of the self-interference signal is not known in advance, as described above, an estimate (signal Self_int) of both the delay and amplitude of the self-interference signal is initially used by control block 280 for interpolation. As described further below, the initial estimates are used to determine the attenuation levels of the attenuators $275_i$, thereby to generate signals $B_i$ which are subsequently combined to generate signal RX_RC. The amount of self-interference at the receiver is then measured to determine whether one or more conditions are satisfied. One such condition may be to determine whether the amount of self-interference has reached below a minimum threshold level. If the condition(s) is not met, an iterative optimization algorithm is performed by control block 280 to arrive at new estimate(s) for either the delay or amplitude, or both the delay and amplitude, of the self-interference signal. The new estimate(s) are subsequently used, as described further below, to generate new attenuation levels for the attenuators, in turn resulting in generation of revised signals $B_i$ as well as revised self-interference signal. The process of measuring the level of the self-interference signal being canceled or reduced at the receiver, arriving at a new estimate for the self-interference signal based on such measurement, and varying the attenuation levels of the attenuators in response continue until the predefined condition(s) is met.

Figure 10:
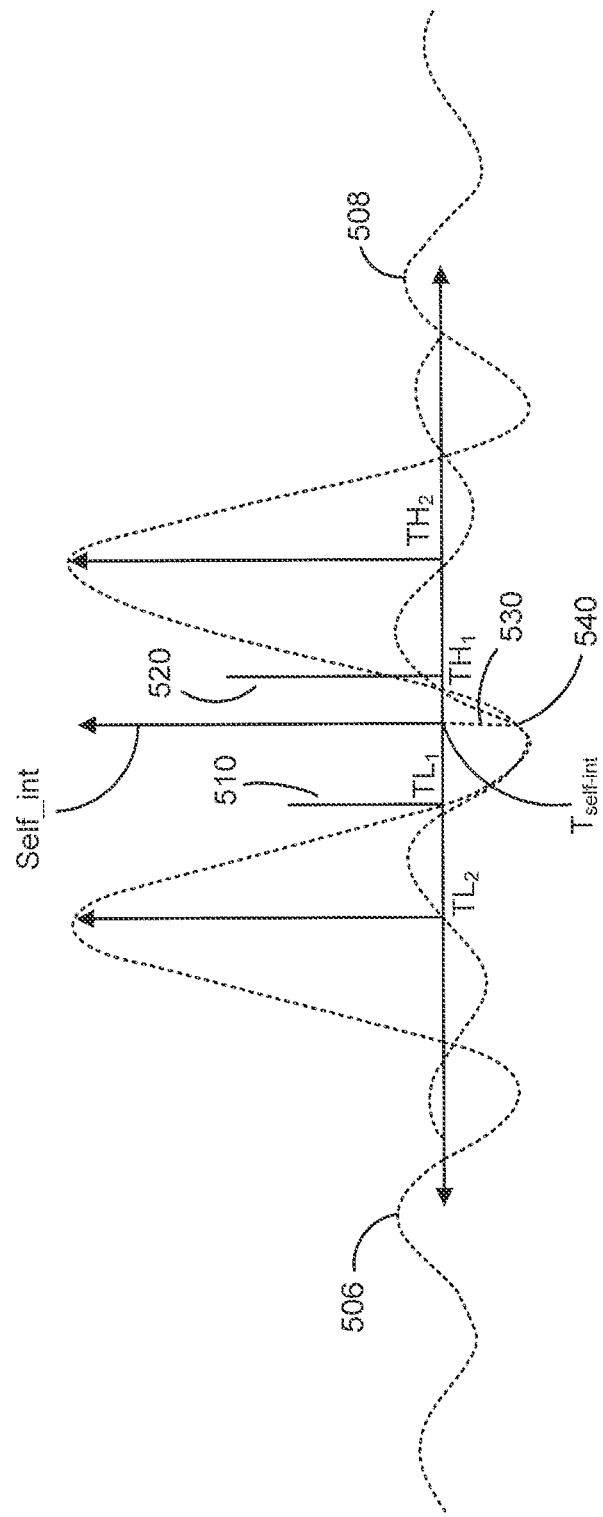
FIG. 10 shows a sinc interpolation process for determine attenuation values applied to a second pair of attenuators of FIG. 6, in accordance with another embodiment of the present invention.
Figure 11:
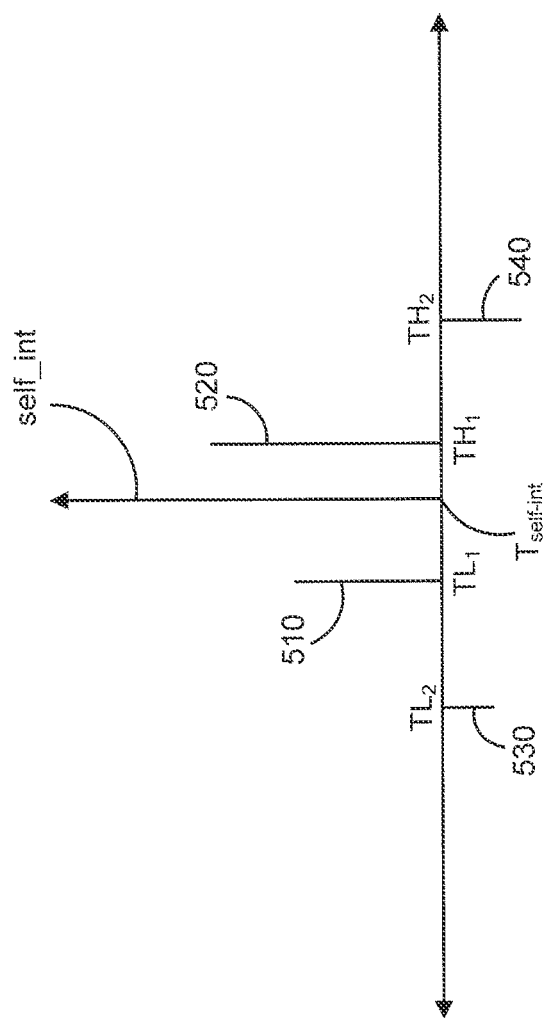
FIG. 11 shows the result of the sinc interpolation process shown in FIG. 10.

FIG. 10 shows the intersection of sinc functions positioned at the window boundaries $TL_2$ and $TH_2$ with the self-interference signal. As is seen, sinc function 506 centered at $TL_2$ is seen as intersecting the self-interference signal at point 530, and sinc function 508 centered at $TH_2$ is seen as intersecting the self-interference signal at point 540. The heights of points 530 and 540 define the level of attenuations applied to attenuators $275_3$ and $275_4$, respectively. FIG. 11 shows the attenuation levels 510, 520, 530, 540 so determined and applied to attenuators $275_1$, $275_2$, $275_3$, and $275_4$ respectively. As is seen in FIGS. 10 and 11, the attenuations levels applied to attenuators $275_1$, $275_2$ have positive values (have a positive polarity), whereas the attenuations levels applied to attenuators $275_3$, $275_4$ have negative values and thus have a negative polarity. It is understood that the attenuation levels for the remaining taps are similarly determined. Further details regarding the application of the sampling theory to reconstruct a sampled signal is provided in "Multirate Digital signal Processing" by Ronald E. Crochiere, and Lawrence R. Rabiner, Prentice-Hall Processing series, 1983, the content of which is incorporated herein by reference in its entirety.

Combiner 295 is adapted to combine signals $B_1, B_2 \ldots B_N$ thereby to generate signal RX_RC representative of the self-interference signal. As the delay of the self-interference signal changes and its position within the windows moves, the intersections of the self-interference signal and the sinc functions change, thereby causing the attenuation levels to change, which in turn causes the reconstructed signal representative of the self-cancellation signal to also change to track the self-interference signal.

Figure 12:
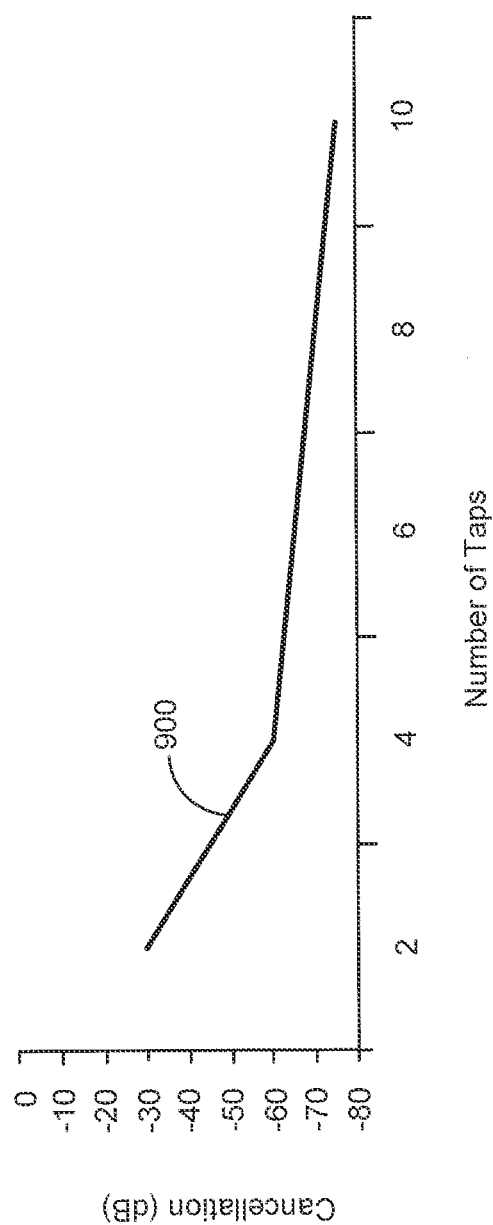
FIG. 12 is an exemplary plot showing the amount of self-interference cancellation as a function of the number of delay paths disposed in analog self-interference cancellation circuit of FIG. 6.

The higher the number of taps, the greater is the amount of self-interference. FIG. 12 is an exemplary plot 900 of the amount of self-interference cancellation as a function of the number of taps. As is seen, the amount of self-interference cancellation for two taps and ten taps are respectively shown as being approximately −30 dB and −75 dB. In other words, by increasing the number of taps, self-interference cancellation on a wider bandwidth is achieved.

Figure 13:
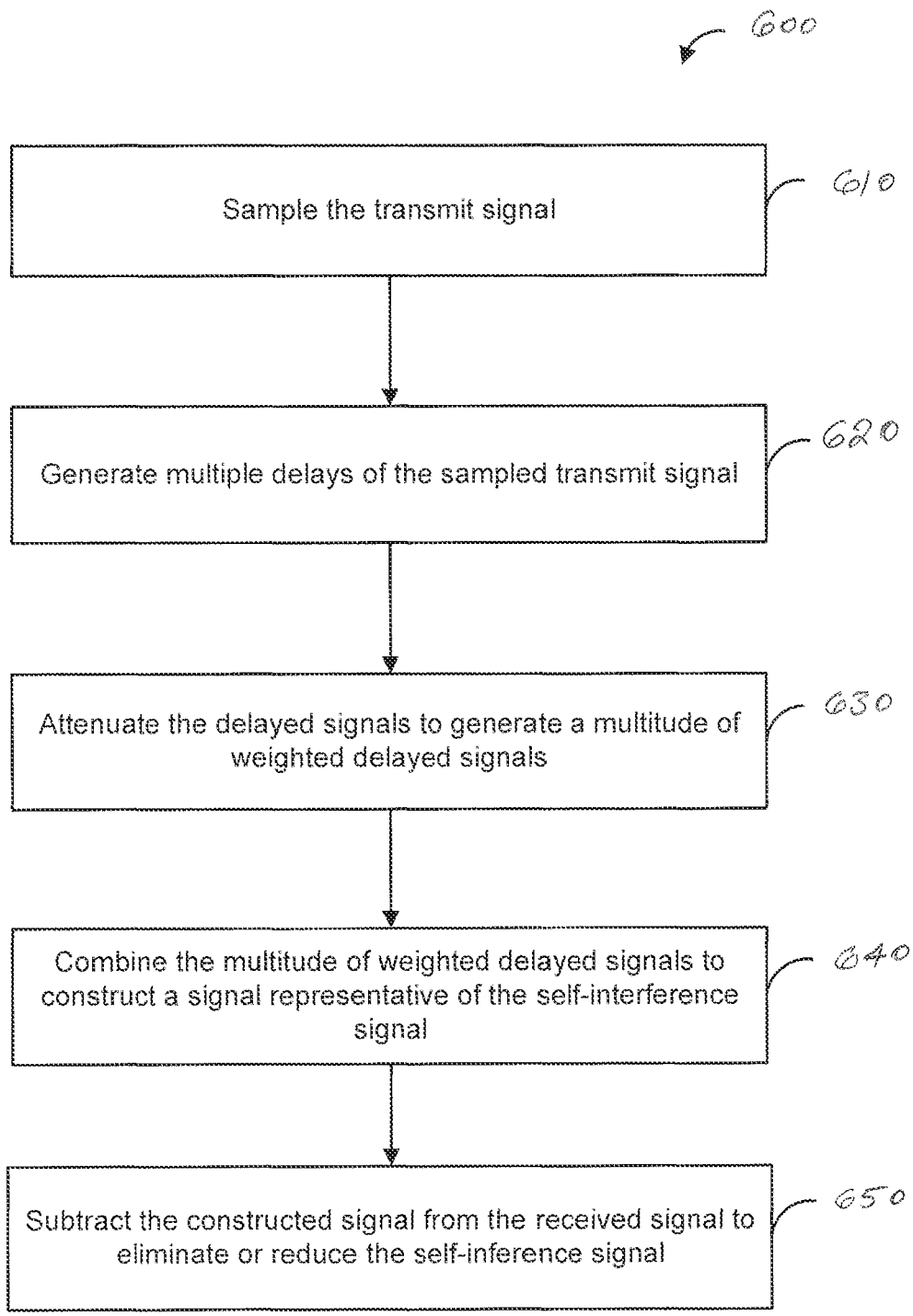
FIG. 13 is a flowchart for canceling or reducing the self-interference signal at a receiver of a communication device, in accordance with one embodiment of the present invention.

FIG. 13 shows a flowchart 600 for canceling or reducing the self-interference signal at a receiver of a communication device, in accordance with one embodiment of the present invention. To achieve this, at 610 the transmit signal is sampled. Thereafter, at 620 a multitude of delayed version of the sampled transmit signal are generated. At 630 the delayed versions of the sampled transmit signal are attenuated to generate a multitude of weighted and delayed signals. At 640, the multitude of weighted, delayed signals are thereafter combined to reconstruct a signal representative of the self-interference signal. The reconstructed signal is subsequently subtracted from the received signal to cancel or reduce the self-interference signal at the receiver.

Dynamic Adaptation of Analog Self-Interference Cancellation Tuning

In accordance with one aspect of the present invention, variable attenuators $275_i$ as shown in FIG. 6 (collectively referred to herein using reference numeral 275) are dynamically tuned (programmed) using a fast algorithm to maximize the self-interference cancellation, as described further below. Assume y(t) represents the self-interference signal, $d_1, \ldots, d_N$ represent delays associated with delay elements $270_i$ shown in FIG. 6, and c(t) represents the reference signal 180 tapped from the transmit path, as is also shown in FIG.

6. Attenuation values $a_1, \ldots, a_N$ are selected so as to minimize the self-interference signal, in accordance with the expression below:

$$\min_{a_1, \ldots a_N} \left( y(t) - \sum_{i=1}^{N} a_i c(t - d_i) \right)^2$$

In accordance with one aspect of the present invention, self-interference signal y(t) is modeled in the frequency domain as a function of the tapped signal c(t) as shown in expression below:

$$Y(f) = H(f) C(f)$$

where H(f) is the frequency domain representation of the distortion introduced by such components as the isolator (e.g. circulator 120), the antenna and the environment, and where C(f) is the frequency domain representation of the tapped signal 180.

Frequency response H(f) may be measured relatively quickly. As is well known, many wireless communication protocols include known preamble codes (i.e., preamble symbols or training sequence) at the beginning of each packet. Preamble codes (symbols) often contain pilot tones having predetermined frequencies and phases and are generally used by a receiver to determine a carrier frequency offset with respect to an oscillator frequency of the receiver. The frequency response H(f) is a fast Fourier transform (FFT) of the self-interference channel which can be measured using the preamble codes (alternatively referred to hereinafter as preamble, preamble symbols, training sequence, training symbols), as is performed in the OFDM standard. The following description of the dynamic analog cancellation is provided with reference to the WiFi standard. It is understood however that embodiments of the present invention are not so limited and that any other communications protocol may also be used to determine frequency response H (f).

The attenuator values are then selected such that the overall frequency domain response of cancellation circuit 150 approximates H(f) as closely as possible. The above optimization problem may then be restated as:

$$\min_{a_1, \ldots a_N} (H(f) - \Sigma_{i=1}^{N} H_i^{a_i}(f))^2 \tag{1}$$

where $H_i^{a_i}$ (f) is the frequency response for delay line i for attenuation setting of $a_i$.

To determine $H_i^{a_i}$ (f), in accordance with one aspect of the present invention, the frequency response of the delay line i (tap) is measured at one attenuation while the attenuation levels of the remaining delay lines are set to their highest value. Accordingly, none of the delay lines except the one being measured is enabled to substantially pass a signal. The scattering or S parameters of the attenuator, which is commercially available from the manufacturers may then be used to compute the relative change in frequency response of the delay line i for all attenuation values. The S-parameters which provide the relative change in frequency response with changing attenuation values may also be measured using a vector network analyzer as known in the art.

To account for manufacturing variability of the attenuators as well as any possible signal flow through the attenuators whose attenuation levels have been set to their highest value, a least squares fit is applied to the collected data so as to find a more accurate response for the attenuators. Using this process, which is performed once for all the delay lines, the frequency response of all the delay lines for all attenuation values of interest (e.g., 128) is determined. To the extent that the frequency response of the delay lines and the attenuation values are independent of the environment, this data may be stored in a memory for future use.

Figure 14:
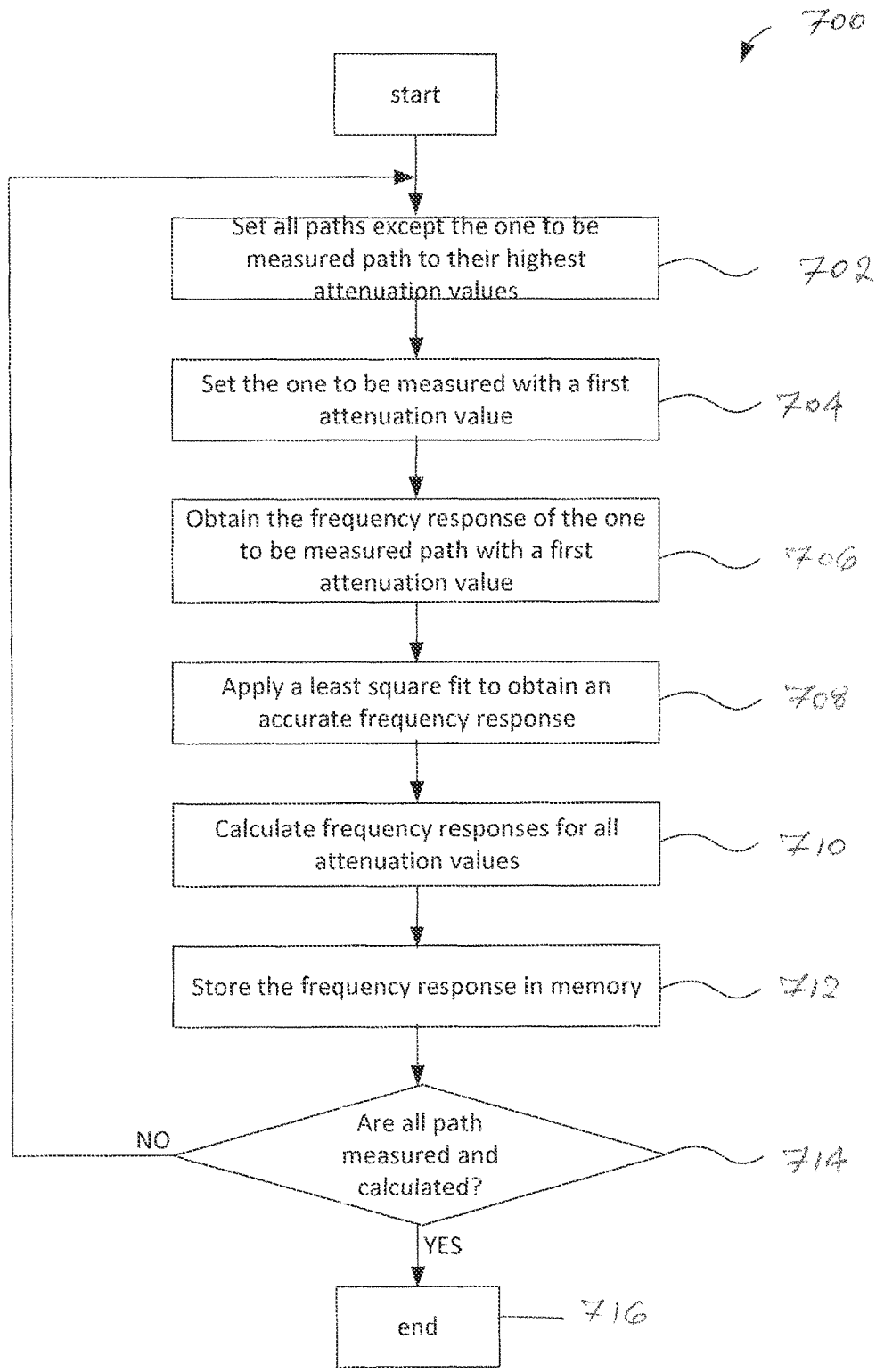
FIG. 14 is a flowchart for calculating and storing the frequency response of the delay paths disposed in analog self-interference cancellation circuit of FIG. 6, in accordance with one exemplary embodiment of the present invention.

FIG. 14 is a flowchart 700 for calculating and storing the frequency response of the delay paths of an analog cancellation circuit, such as delay paths 290 shown in FIGS. 5 and 6, in accordance with one exemplary embodiment of the present invention. At 702, the attenuation levels for all the paths except the path being measured (the first path) are set to their highest values. At 704 the attenuation level of the first path is set to a first attenuation value. At 706 the frequency response of the first path is measured for the first attenuation value. In some embodiments, to improve the accuracy, the frequency response of the first path is also measured using a second attenuation value. At 708, a least square fit is applied to obtain a more accurate frequency response. At 710, the S parameters of the attenuator disposed in the first path is used to compute the change in frequency response of the attenuators for all attenuation values. At 712, the frequency responses so obtained are stored in a memory. At 714, a determination is made as to whether the process of measuring, calculating and storing the frequency responses have been performed for all the paths disposed in the analog cancellation circuit. If so, the process ends at 716. If not, the process is repeated from 702. The memory may be a static synchronous random access memory (SRAM), a dynamic random access memory (DRAM), a read-only memory (ROM), a flash memory, or the like.

After obtaining the frequency response $H_i^{a_i}(f)$ for each delay line, the following algorithm, in accordance with one embodiment of the present invention, is performed to optimize the attenuation settings so as to maximize the self-interference cancellation.

First, as was described above, the Frequency response H(f) is measured using the preamble, for example, the WiFi preamble. Thereafter, expression (1), shown above, is solved by relaxing it to a linear program as shown below:

$$\rho_j^i, \forall i, j, \text{ s.t. } i \in \{1, \ldots, N\}, j \in \{1, \ldots, 128\} \min \quad (2)$$

$$\left(H(f) - \sum_{i=1}^{N} \rho_j^i H_i^{a_j}(f)\right)^2$$

subject to, $\rho_j^i \in \{0, 1\} \forall i, j$ $$\sum_{j=1}^{128} \rho_j^i = 1, \forall i$$

where $\rho_j^i$ can be relaxed to a continuous variable from [0,1].

Expression (2) can be formed as a convex problem as follows:

$$\rho_j^i, \forall i, j, \text{ s.t. } i \in \{1, \ldots, N\}, j \in \{1, \ldots, 128\} \min$$

$$\left(H(f) - \sum_{i=1}^{N} \rho_j^i H_i^{a_j}(f)\right)^2$$

subject to, $0 < \rho_j^i < 1, \forall i, j$ $$\sum_{j=1}^{128} \rho_j^i = 1, \forall i$$

Random rounding is used on $\rho_j^i$ to find a solution for the attenuator settings to achieve the required cancellation level, e.g., 60 dB. The algorithm described above reduces the search space of the attenuator values to a polynomial set compared to the exponential search space. Since the above-described calculations in performing this algorithm are carried out offline and implemented using the frequency response model (i.e., by looking up the frequency response of the circuit for any combination of attenuator values stored in the memory), the algorithm is relatively fast. In one example, it takes less than 1 μsec to find the optimized attenuation values.

To further improve self-interference cancellation and account for variation in the manufacture of the attenuators and the S parameter data provided by the manufacturers, an additional gradient descent algorithm may be used to further optimize the attenuation values. Typically, a gradient descent algorithm takes several hundreds of iterations to converge. However, in accordance with embodiments of the present invention, since the optimization algorithm described herein provides the descent from a much closer starting point, the gradient descent converges to the required point in, for example, 10-12 iterations. Accordingly, even assuming that the analog cancellation tuning takes 900-1000 μsec and that tuning is required once every 100 msec, analog cancellation tuning, in accordance with the present invention, adds less than 1% to the entire tuning cycle.

In accordance with another embodiment of the present invention, the analog cancellation tuning, which may be performed periodically, is further reduced by two orders of magnitude, as described further below. An analog cancellation circuit, in accordance with embodiments of the present invention, may be viewed as a filter whose response is tuned so as to match as closely as possible to the frequency response of the self-interference channel. To achieve this, the frequency response of the cancellation circuit for different combinations of attenuator values is first determined, as described above to form a matrix A each column of which is a frequency response for a particular value of an attenuator at K different frequencies in the band of interest (e.g., K=128 for a 20 MHz bandwidth in the current prototype). Assuming H (f) is the frequency response of the channel experienced by the received interference signal in the frequency domain (e.g., the channel as represented by the antenna, circulator and any strong environmental reflections), the analog cancellation tuning problem reduces to the efficacy of the tuning that depends on the accuracy in the measurement of H(f).

As described above, the frequency response of the channel H(f) may be measured using the preamble of the received interference signal y(t) (e.g., the first two OFDM symbols of a transmitted WiFi packet which are known as preamble symbols). The accuracy in measuring H(f) is however limited by the nonlinearities in the transmit-receive path that may be lower than the transmitted signal by, e.g. 30 dB. In accordance with one embodiment of the present invention, H(f) is measured accurately and relatively quickly to tune the analog cancellation circuit. Assume x(t) is the baseband signal that is being transmitted after upconversion and amplification, the transmitted signal $x_{tx}(t)$ may be written as shown below:

$$x_{tx}(t) = x(t) + a_3 x(t)^3 + a_5 x(t)^5 + a_7 x(t)^7 + K + w(t)$$

where K represents the higher order harmonics.

The nonlinear components and the noise w(t) of the above expression are unknown. Signal $x_{tx}(t)$ is further flows through the circulator and the antenna, collectively represented by channel H(f). Signal Y(f) received at the receiver may thus be defined as shown below:

$$Y(f)=H(f)*F(x(t)+a_3x(t)^3+K)+\text{phase noise} \qquad (3)$$

In the above expression, parameter $a_3$ is around $10^{(-30/20)}$, i.e., it is 30 dB lower that than x(t), and phase noise distortion is 40 dB lower than the signal level of x(t). One aspect of the embodiments of the present invention, uses x(t) to estimate the channel H(f). It is understood that other terms in the received interference signal may limit the accuracy of the estimation to, for example, 30 dB (the estimation noise is 30 dB lower).

In accordance one embodiment of the present invention, H (f) is estimated iteratively. As is well known, the WiFi preamble, as defined for example in IEEE 802.11g and IEEE 802.11n standards, has two OFDM symbols, each with a duration of 4 μsec. After receipt of the first transmitted OFDM symbol, the expression is solved for Y(f) to generate a first estimate $h_a$ of the interference channel h, which may be defined as shown below:

$$h_a=h+e_1$$

where $e_1$ represents the difference (error) between $h_a$ and h, and is lower than h by, e.g., 30 dB.

In one embodiment, an off-line algorithm, such as Expression (1) shown above, is used to optimize the following expression:

$$\min_x \|h_a - A*x\|^2 \qquad (4)$$

to estimate a solution $\hat{x}$ for x that minimize expression (4). The attenuator is then tuned, as described above, assuming that $\hat{x}$ is the transmitted signal. Accordingly, a self-interference cancellation of, e.g. 30 dB, is achieved. The channel is now assumed to be represented by h–A*$\hat{x}$. Thereafter, the second OFDM symbol is transmitted and the channel response is measured. The channel may be represented as:

$$h_b=(h-A\hat{x})+e_2 \qquad (5)$$

Accordingly, $e_2$ is lower than h–A$\hat{x}$ by, e.g. 30 dB, and h–A$\hat{x}$ is lower than h by the same amount of e.g., 30 dB. Accordingly, given the above example, $e_2$ is 60 dB lower than h by, e.g. 60 dB. Assume further that:

$$\tilde{h}=h_b+A*\hat{x}$$

$$\tilde{h}=h+e_2$$

Thus, with the second estimate $\tilde{h}$ of h that has an error of, for example, 60 dB lower, the optimization algorithm is returned to find a second estimate $\tilde{x}$ of x, to provide, for example, 60 dB cancellation or reduction in the channel response. Consequently, in accordance with one embodiment of the present invention, a cancellation of, for example, 60 dB is achieved in nearly μsec. Assuming that the circulator provides a cancellation of 15 dB, and the analog cancellation circuit provides another, for example 55-60 dB, of cancellation, a total cancellation of 70-75 dB is achieved by tuning the attenuators with two preamble symbols within nearly 8 μsec time period.

Figure 15:
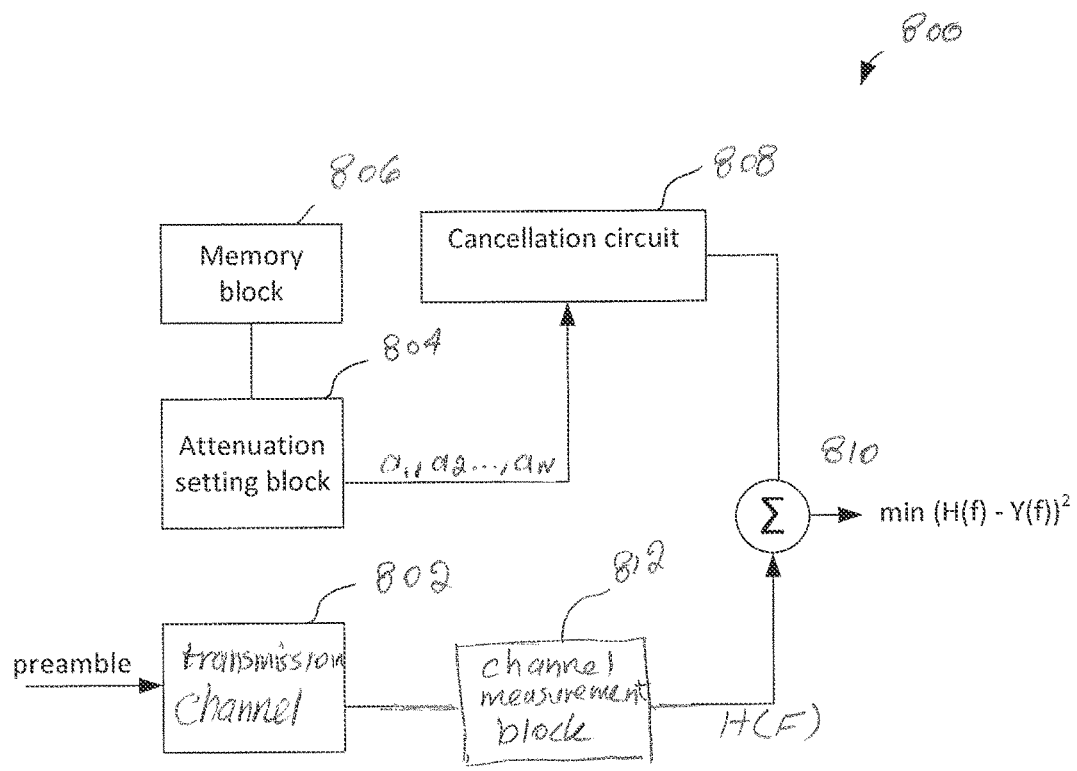
FIG. 15 is a simplified block diagram of an analog self-interference cancellation circuit, in accordance with one embodiment of the present invention.

FIG. 15 is a simplified block diagram of an analog self-interference cancellation circuit 800, in accordance with one embodiment of the present invention. Circuit 800 is shown as including, in part, an analog cancellation circuit 808, a transmission channel 802, attenuation setting block 804, a combiner 810, a memory 806 storing the frequency response associated with each attenuation value of the variable attenuators disposed in cancellation circuit 808 and controlled by attenuation setting block 804, and a channel measurement block 812. Transmission channel 802 is configured to enable the measurement of the frequency response of the channel H(f) by transmitting a training signal (e.g., preamble). In one embodiment, transmission measurement block 812 may include an FFT engine for generating the frequency response of the transmitted preamble signal. As described above, the frequency response H(f) can be represented in the form of a matrix A having M rows and N columns, wherein M is the number of the delay paths of cancellation circuit 808, and N is the number of columns each being a frequency response for attenuations selected for the attenuators disposed in cancellation circuit 808 and in accordance with the values stored in memory 806. Based on matrix A, attenuation setting block 804 selects attenuation values from the memory for the various delay paths (attenuators) so that the difference at the output of subtractor 810 between the signal received from cancellation circuit 808 and transmission channel 802 is at a minimum value. In one embodiment, a processor/computer may be configured to perform the operations of and thus be used in place of both attenuation setting block 804 and channel measurement block 812.

Digital Self-Interference Cancellation

Referring to FIG. 5, digital cancellation circuit 160 is to adapted to remove residual self-interference signal that may still be present at the output of ADC 138. For example, assume that the self-interference signal present in signal 184 has a magnitude of 130 dB, 60 dB of which is removed by analog cancellation circuit 150. Much of the remaining self-interference signal is removed by digital cancellation circuit 160 which is configured to remove both the linear and nonlinear components of the self-interference signal in a digital domain, as described further below. In one embodiment, digital cancellation of both linear and nonlinear of components of the self-interference signal is performed by a processor/computer.

Cancellation of Linear Components

Linear components of the self-interference signal may be caused by, for example, the circulator, as well as any delayed reflections of the transmitted signal from the environment. The reflections may be delayed and attenuated by different unknown amounts.

In accordance with one aspect of the present invention, a portion of the self-interference is canceled in the digital domain as a linear and non-causal function of the transmitted signal. Since the previously transmitted packets as well as packets that have not yet been transmitted but are in the pipeline for transmission are both known, the non-causality of the model poses no difficulty in estimating a component of the self-interference signal. Accordingly, the received sample y[n] may at any instant be modeled as a linear combination of up to k samples of the known transmitted signal x[n] before and after the instant n. The parameter k is empirically chosen and is a function of the amount of memory in the channel. So y[n] may be written as shown in following:

$$y[n]=x[n-k]h[k]+x[n-k+1]h[k-1]+K+x[n+k-1]h[-k+1]+w[n] \qquad (6)$$

where h[k], h[k−1], . . . , h[−k+1] represent the attenuation levels of the transmitted signal, and w[n] is the receiver noise floor.

The coefficients h[n] may be estimated by using packet preambles that are widely used in most wireless transmissions. For example, the WiFi standard uses a preamble of two known OFDM symbols at the start of the packet. Assume the samples representing the preamble are represented by $x_{pr}[n]$. Assume further that the receive samples corresponding to the preamble are represented by y [0], ..., y[n]. The above channel equations may then be written specifically for the preamble as:

$$y = Ah + w \quad (7)$$

where A represents Toeplitz matrix of $x_{pr}[n]$:

$$A = \begin{pmatrix} x_{pr}(-k) & \ldots & x_{pr}(0) & \ldots & x_{pr}(k-1) \\ x_{pr}(1-k) & x_{pr}(-k) & \ldots & \ldots & \ldots \\ x_{pr}(2-k) & x_{pr}(1-k) & x_{pr}(-k) & \ldots & \ldots \\ x_{pr}(n-k) & \ldots & x_{pr}(n) & \ldots & x_{pr}(n+k-1) \end{pmatrix}$$

The linear components of the cancellation signals may thus be obtained by finding a maximum likelihood estimate of the vector h to achieve the following:

$$\text{minimize} \|y - Ah\|_2^2 + \lambda * \|h\|_2^2 \quad (8)$$

Since the values of the preamble samples are known, matrix A is also known in advance and may be precomputed. Parameter $\lambda$ represents the regularization parameter; it is proportional to the number of preamble samples and inversely proportional to the number of taps or weights estimated of the tapped transmitted signal. Vector h may be computed from the following expression:

$$h = \underbrace{(A^C A + \lambda * I)^{-1} A^C}_{[a_1^\dagger(\lambda) a_2^\dagger(\lambda) \ldots a_{Npre}^\dagger(\lambda)]} \cdot y \quad (9)$$

where $A^C$ is the complex matrix of A, and I is the identity matrix. Since A and $\lambda$ are known, Expression (9) can be pre-computed to determine vector h.

Vector h may also be computed by multiplying the i th received sample of the preamble $y_i$, which arrive serially, with $a_i^\dagger(\lambda)$ which is the i th column of matrix $(A^C A + \lambda * I)^{-1} A^C$, in accordance with the following expression:

$$h = \sum_{i=0}^{Npre} (y_i a_i^\dagger(\lambda)) \quad (10)$$

Thus, the estimation algorithm computes the linear distortions that the transmitted main signal experiences for every packet and dynamically adapts to it. Vector h is used as shown in expression (6) above to determine the linear components of the interference signal received by, for example, combiner 140 shown in FIG. 1.

Figure 16:
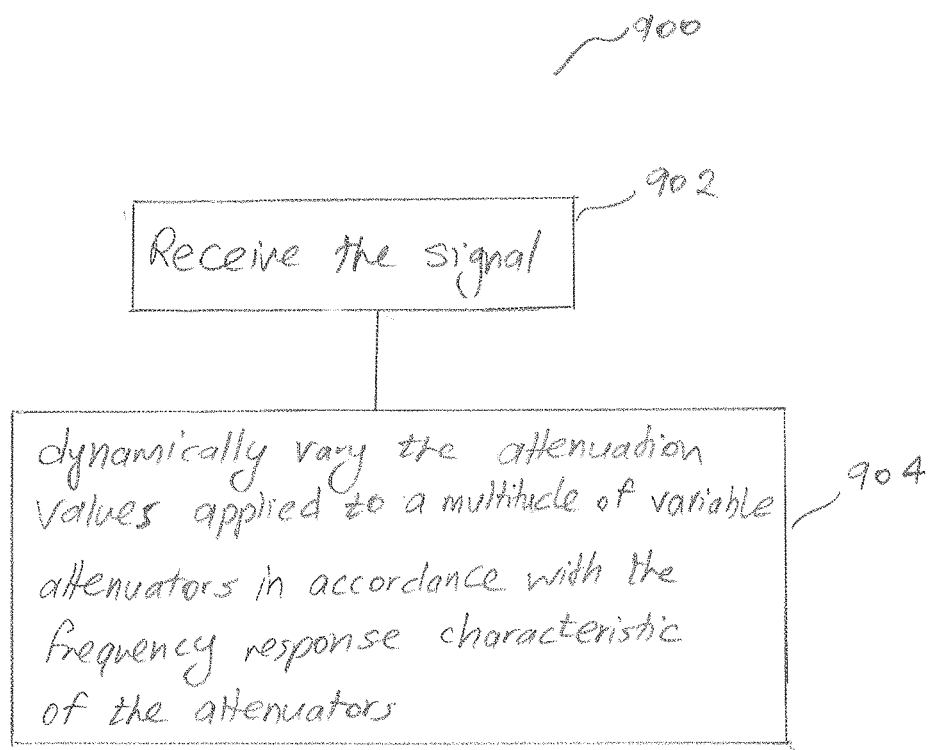
FIG. 16 is a flowchart for removing, via in part analog signals, a portion of the self-interference signal present in a signal received via a wireless communication system, in accordance with one embodiment of the present invention.

FIG. 16 is a flowchart 900 for removing, via in part analog signals, a portion of the self-interference signal present in a signal received via a wireless communication system, in accordance with one embodiment of the present invention. The wireless communication system includes a multitude of variable attenuators. At 902, the signal is received. At 904, the attenuation values applied to the variable attenuators are dynamically varied, in accordance with the frequency response characteristics of the attenuators to remove the portion of the self-interference signal from the received signal.

Cancellation of Nonlinear Components

To further cancel the self-interference signal, in accordance with one embodiment of the present invention, a nonlinear function generated the Taylor series expansion is used. Accordingly, the signal being transmitted is defined as shown below:

$$y(t) = \sum_m a_m x_p(t)^m \quad (11)$$

where $x_p(t)$ is the ideal passband analog signal for the digital representation of known signal x(n).

Since only odd order terms (e.g., the terms containing $x_p(t)$, $x_p(t)^3$, $x_p(t)^5$, ...), have non-zero energy in the frequency band of interest, the even order terms may be safely ignored. The first term $x_p(t)$ is and is estimated and canceled using the algorithm described above. The above model may be further reduced and defined in the digital baseband domain as:

$$y(n) = \sum_{m \in odd\ terms, n=-k, \ldots, k} x(n)(|x(n)|)^{m-1} * h_m(n) \quad (12)$$

where k is the number of samples in the past and future which significantly influence the value of the signal at instant n, and $h_m[n]$ is the weight associated with the term having order m and needs to be estimated, as described further below, to perform nonlinear cancellation.

To estimate $h_m[n]$, the pre-existing preambles such as the WiFi preamble or LTE training symbols may be used, as described above. Assuming a sampling rate of 160 MHz, a WiFi preamble includes a total of 1280 digital samples at the Nyquist sampling rate. However, variables $h_m(n)$ is a function of 2 k (i.e., k samples of the past transmit signal and k samples of the future signal to be transmitted), and the highest value of m that exhibits strength greater than the receiver noise floor.

A simple model based on the 1, 3, 5, 7, 9, 11th order terms and which uses up to 128 samples (128 is suggested by the WiFi standard and is equal to the length of the WiFi OFDM cyclic prefix) from both the future and the past at any instant would require the estimation of 128*2*6=1536 variables using 1280 equations. The number of samples required is a function of the amount of multipath. As is known, the higher the multipath, the higher should be the number of samples in the past and future used in the calculation. A system of 1280 equations with 1536 variable is an under-determined system and solving it would increase the noise floor significantly.

Because many of the higher order terms have relatively less power than the lower order terms (the $7^{th}$ order term has lower power than the $5^{th}$ order term which, in turn) has lower power than the $3^{rd}$ order term, in accordance with one aspect of the present invention, many of the higher order terms are set to zero. FIG. 8 shows a plot of the strength of the main signal and higher order nonlinear terms relative to the receiver noise floor according to an embodiment of the present invention. As it can be seen, higher order terms have weaker strength relative to the main signal, and consequently, their multipath components also decay quickly below the receiver noise floor. In other words, far fewer than 128 samples from the past and future impact the value of the self-interference harmonic component at any given instant.

In accordance with one aspect of the present invention, for indoor WiFi systems, across all nonlinear higher order terms, a total of 224 variable, which may be easily accomplished using the WiFi preamble, are empirically shown to be required for nonlinear estimation. The method used for estimating the coefficients is similar to the one described above in connection with the linear digital cancellation step described above with matrix A defined as below:

$$\begin{pmatrix} x_{pr}(-k) & \ldots & x_{pr}(k-1) & x_{pr}(-k) \cdot |x_{pr}(-k)|^2 & \ldots & x_{pr}(k-1) \cdot |x_{pr}(k-1)|^{10} \\ x_{pr}(1-k) & \ldots & x_{pr}(k) & x_{pr}(1-k) \cdot |x_{pr}(1-k)|^2 & \ldots & x_{pr}(k) \cdot |x_{pr}(k)|^{10} \end{pmatrix}$$

Figure 17:
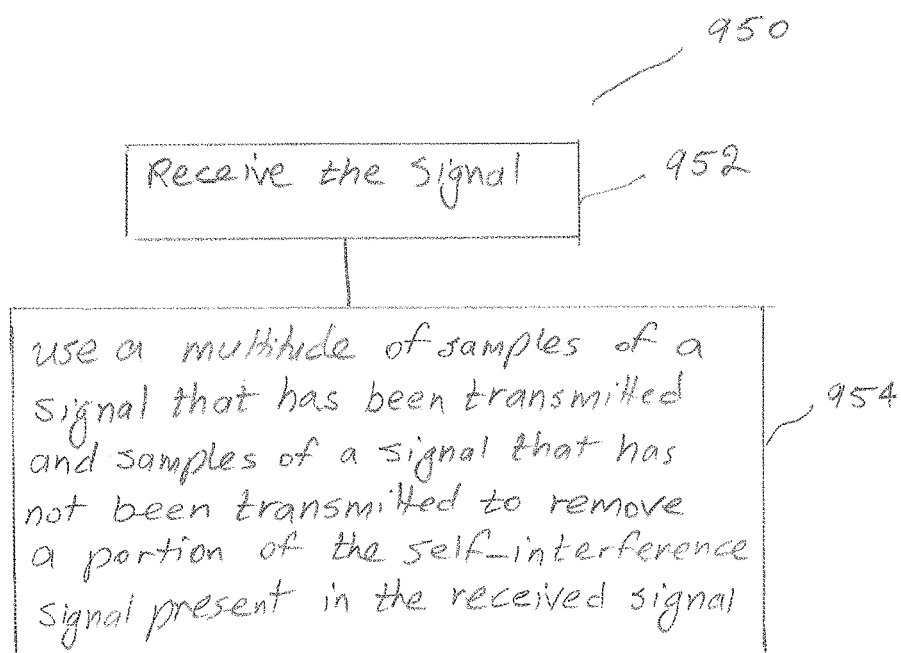
FIG. 17 is a flowchart for removing, via digital signals, a portion of the self-interference signal present in a signal received via a wireless communication system, in accordance with one embodiment of the present invention.

FIG. 17 is a flowchart 950 for removing, via digital signals, a portion of the self-interference signal present in a signal received via a wireless communication system, in accordance with one embodiment of the present invention. At 952, the signal is received. At 954 a multitude of samples of a signal that has been transmitted and a multitude of samples of a signal that has not been transmitted are used to remove the portion of the self-interference signal from the received signal.

Gain Phase Offset Cancellation

Radio transmitters have phase imbalance which is caused, in part, by inaccurate phase shift between the I and Q channels (ideally it should be 90 degrees but it is hard to achieve in practice). Gain imbalance occurs due to inaccurate gains applied by DAC, prior to upconversion. However, assuming a known ideal signal is transmitted, $x_{kn}(n)=x_I(n)+jx_Q(n)$. In practice, a non-ideal $x_a(n)=x_I(n)+jae^{j\phi}x_Q(n)$ is transmitted, where a is gain imbalance and $\phi$ is phase imbalance. Mathematically $x_a(n)$ may be written as follows:

$$x_a(n) = \frac{x_{kn}(n) + x_{kn}^C(n)}{2} + jae^{j\phi}\frac{x_{kn}(n) - x_{kn}^C(n)}{2} \quad (13)$$

$$x_a(n) = x_{kn}(n) + bx_{kn}^C(n) \quad (14)$$

where $x_{kn}(n)$ is a known transmitted ideal signal, "b" represents the gain and phase imbalance, and $x_{kn}^C(n)$ is the complex of $x_{kn}$.

In general, there is some time offset as well which can be modeled as channel. This time offset is taken into account as follows:

$$x_a(n)=x_{kn}(n)+bh_d(n)*x_{kn}^C(n) \quad (15)$$

where $h_d(n)$ compensates for the delay mismatch.

Some embodiments of the present invention provide the following algorithm for the estimation of $bh_d(n)$ or b which can just be absorbed into $h_d(n)$, so then it can compensate for $h_d(n)$ in the entire cancellation model (linear and nonlinear cancellation) according to an embodiment. This effect can be taken care of by first estimating the channel for linear and nonlinear components, then solve a simple estimation problem for $h_d(n)$ to maximize the cancellation. First, a large model is made, channels corresponding to $x_{kn}(n)$ and $x_{kn}^C(n)$ are estimated, then $h_d(n)$ is fitted as best as possible. This model is then iteratively repeated to refine the estimate of $h_d(n)$.

However, for this technique to work, it requires that $X(f) \neq X^*(-f)$, since otherwise this system of equation would degenerate. However, this distortion is a property of the radio and does not change with temperature and other variations. In one embodiment, the transmitter may send out a training sequence $X(f)$ that is not equal to its complex conjugate for calibrating the gain and phase imbalance. A one-time calibration of the radio is performed by designing a transmission that satisfies $X(f) \neq X^*(-f)$ and measuring b. Once done, this gain and phase imbalance is then used in the digital cancellation algorithm.

LO Leakage Cancellation

An embodiment of the present invention also provides cancellation of the LO leakage, which is a constant added before the power amplifier, by mixer and other components. This can be modeled in the same manner as gain phase offset estimate process described above.

Modeling Memory in Cancellation

A final challenge is that nonlinearities have memory, that is the value of the nonlinear distortion at any instant depends on the signal value at a previous instant. The key reason is the low noise amplifier (LNA) of the receiver. The LNA may amplify very weak radio frequency signals with a fixed or variable gain and generate an amplified received signal. The LNA faces high power interference components with different delays. These components also include contributions from the analog cancellation board. With these distortions the received signal with memory can be modeled as follows:

$$y_r(n) = \sum_m \sum_{i_1,K,i_m} x(n-i_1)x(n-i_2)Kx(n-i_m)h_m(i_1, K, i_m) \quad (13)$$

where $y_r(n)$ is residual after canceling all other linear and nonlinear components, m represents the memory depth (i.e., the multipaths), and K represents indexes from the intermediate variables (e.g., $i_2$, $i_3$, . . . , $i_{m-1}$ or $x(n-i_3)$, . . . , $x(n-i_{m-1})$). A naive approach to estimating these coefficients for all memory terms would require a large set of variables (exponential complexity with the memory term being the exponentiation factor). Estimating all of them would be prohibitively expensive and not feasible with a few training symbols.

Embodiments of the present invention provide a search technique that exponentially reduces the number of variables that need to be estimated. In an embodiment, the positions $i_1, \ldots, i_m$ are determined by strong multi-paths and the taps (delays) from the cancellation board itself. These are typically located $$i_1, i_2 \ldots i_m \in \left(-\frac{K}{2}, \frac{K}{2}\right)$$

in digital domain. The number of positions K can be inferred, it includes learning for N taps of cancellation boards and strong multi-paths (R components), these strong multipaths (a total of 5) can be learned from the linear channel response. So for a typical case, these would be a small number (K=N+R, the number of taps N in the cancellation circuit and the significant multipaths R from the environment). In an embodiment, there are 8 taps and 5 channel responses so that K=13. However, learning even for m=3 and K=13 positions, i.e., $i_1$, $i_2$, $i_3 \in$ (−6,6), requires estimating $13^3$ coefficients (h), and for m=5, 7, 9 would increase exponentially. Further, whenever analog cancellation is retuned these need to be re-learned.

An embodiment of the present invention solves this problem by smart iterative estimation to trim down the computation complexity for $5^{th}$, $7^{th}$ and higher order. Assuming there are 13 strong paths, so 13 digital samples are needed for them (i.e., digital samples from (−6, 6). Now, Equation (13) shows that their inter-products are at the locations where the h($i_1$, $i_2$, K, $i_m$) is significant. So this chunk is selected to estimate the h($i_1$, $i_2$, K,$i_m$). This takes O($13^3$*W) computation every-time a sphere around an inter-mod product in estimation is considered, then find which of them are significant. Once the model for m=3 has been learned, then m=5 becomes simpler. The reason is that components which have significant contribution in m=3 create significant contributions for m=5 as well. For example, if h($i_1$, $i_2$, $i_3$) is significant, then h($i_1$, $i_2$, $i_3$, $i_4$, $i_5$) will likely be significant, where ($i_4$,$i_5$)∈(−6,6) predefined locations. Thus for every step the added complexity is O($13^2$*W). The above search will be conducted until m=7. This entire process takes 4-5 μsec. This location finding has to conducted every time analog cancellation is tuned. Once locations are known, it is taken in to account in the channel matrix and then computed in O(W) time. For commodity WiFi radios, in total 132 coefficients at the 40 MHz sampling rate for a bandwidth of 20 MHz have to be estimated, which can be done on a per packet basis using the preamble.

Figure 18:
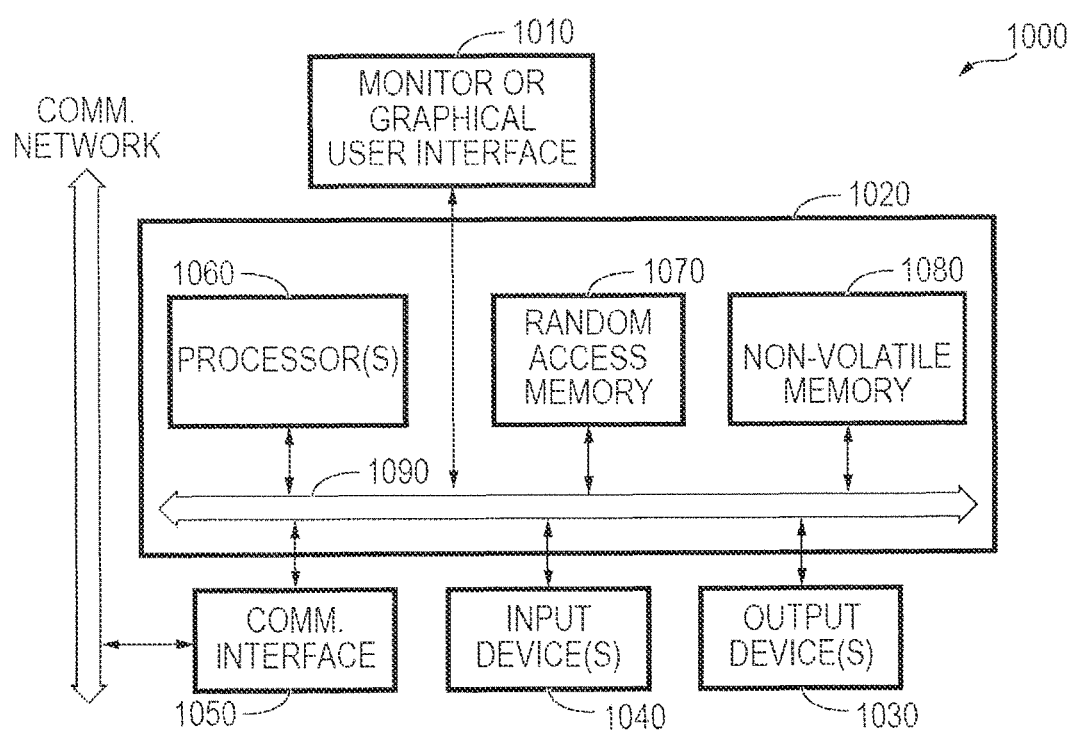
FIG. 18 is a simplified block diagram of an exemplary computer or data processing system in which portions of analog self-interference cancellation circuit, as well as the digital self-interference cancellation circuit may be disposed.

FIG. 18 is a simplified block diagram of an exemplary computer or data processing system 1000 in which portions of analog self-interference cancellation circuit, such as controller 20 shown in Figure or controller 280 shown in FIG. 6, as well as the digital self-interference cancellation circuit, such digital cancellation circuit 18 of FIG. 1 or digital cancellation circuit 160 of FIG. 5, may be embodied. Computer system 1000 is shown as including a monitor 1010, a computer 1020, user output devices 1030, user input devices 1040, communications interface 1050, and the like.

As shown in FIG. 18, computer 1020 may include one or more processors or processing units 1060 that communicates with a number of peripheral devices via a bus subsystem 1090. These peripheral devices may include user output devices 1030, user input devices 1040, communications interface 1050, and a storage subsystem, such as random access memory (RAM) 1070 and non-volatile memory 1080.

User input devices 1030 include all possible types of devices and mechanisms for inputting information to computer system 1020. These may include a keyboard, a keypad, a touch screen incorporated into the display, audio input devices such as voice recognition systems, microphones, and other types of input devices. User input devices 1030 typically allow a user to select objects, icons, text and the like that appear on the monitor 1010 via a command such as a click of a button or the like. User output devices 1040 include all possible types of devices and mechanisms for outputting information from computer 1020. These may include a display (e.g., monitor 1010), non-visual displays such as audio output devices, etc.

Communications interface 1050 provides an interface to other communication networks and devices. Communications interface 1050 may serve as an interface for receiving data from and transmitting data to other systems. In various embodiments, computer system 1000 may also include software that enables communications over a network.

RAM 1070 and disk drive 1080 are examples of tangible media configured to store data including, for example, executable computer code, human readable code, or the like. Other types of tangible media include floppy disks, removable hard disks, semiconductor memories such as flash memories, non-transitory read-only-memories (ROMS), battery-backed volatile memories, and the like. RAM 1070 and non-volatile memory 1080 may be configured to store the basic programming and data constructs that provide the functionality described above in accordance with embodiments of the present invention. Software code modules and instructions that provide such functionality may be stored in RAM 1070 and/or non-volatile memory 1080. These software modules may be executed by processor(s) 1060. RAM 1070 and non-volatile memory 1080 may also provide a repository for storing data used in accordance with embodiments of the present invention.

RAM 1070 and non-volatile memory 1080 may include a number of memories including a main random access memory (RAM) for storage of instructions and data during program execution and a read only memory (ROM) in which fixed non-transitory instructions are stored. RAM 1070 and non-volatile memory 1080 may include a file storage subsystem providing persistent (non-volatile) storage for program and data files. RAM 1070 and non-volatile memory 1080 may also include removable storage systems, such as removable flash memory.

Bus subsystem 1090 provides a mechanism for enabling the various components and subsystems of computer 1020 communicate with each other as intended. Although bus subsystem 1090 is shown schematically as a single bus, alternative embodiments of the bus subsystem may utilize multiple busses.

Various embodiments of the present invention may be implemented in the form of logic in software or hardware or a combination of both. The logic may be stored in a computer readable or machine-readable non-transitory storage medium as a set of instructions adapted to direct a processor of a computer system to perform the functions described above in accordance with embodiments of the present invention. Such logic may form part of a computer adapted to direct an information-processing device to perform the functions described above.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices or other media, now known or later developed, that are capable of storing code and/or data. Various circuit blocks of the embodiments of the present invention described above may be disposed in an application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above descriptions of embodiments of the present invention are illustrative and not limitative. For example, the various embodiments of the present inventions are not limited to the use of preamble symbols, which may be WiFi preambles, LTE preambles or otherwise. Other modifications and variations will be apparent to those skilled in the art and are intended to fall within the scope of the appended claims.

What is claimed is:

1. A system for full-duplex signal shaping for a full-duplex radio comprising:
   An analog self-interference cancellation component, coupled to a transmit line and a receive line of the full-duplex radio, that removes a first portion of self-interference from a receive signal of the full-duplex radio; the analog self-interference cancellation component comprising:
   a plurality of signal paths, each signal path including a delay element and a scaling element, wherein each signal path receives a sampled transmit signal and outputs a delayed and weighted transmit signal;
   a combiner that combines the delayed and weighted transmit signals of the plurality of signal paths to form a self-interference signal representative; and
   a controller that controls parameters of the scaling elements; and
   A digital filter engine, coupled to the transmit line and the receive line of the full-duplex radio, that removes a second portion of self-interference from the receive signal.

2. The system of claim 1, wherein the digital filter engine includes programmable filters, intermediate frequency converters, and a filter engine API; wherein the filter engine API configures the programmable filters and intermediate frequency converters to perform full-duplex signal shaping.

3. The system of claim 2, wherein one of the programmable filters is a finite response filter.

4. The system of claim 1, wherein the controller further controls parameters of the delay elements.

5. The system of claim 1, wherein the scaling elements comprise a variable attenuator and parameters of the scaling elements comprise a variable attenuator attenuation value.

6. The system of claim 5, wherein the controller controls parameters of the scaling elements based on sinc function intersections with an estimated self-interference signal; wherein the controller adapts the parameters of the scaling elements using an iterative optimization algorithm.

7. The system of claim 6, wherein the iterative optimization algorithm includes selecting a subset of coefficients based on a coefficient selection algorithm.

8. The system of claim 1, wherein the controller controls parameters of the scaling elements by determining signal path responses, measuring self-interference, and adapting the parameters of the scaling elements based on the signal path responses and the self-interference.

9. The system of claim 1, wherein the controller controls parameters of the scaling elements by receiving signal path response data, generating a first self-interference signal estimate, applying a first set of parameter values based on the first self-interference signal estimate, generating a second self-interference signal estimate using the first set of parameter values, and applying a second set of parameter values based on the second self-interference signal estimate.

10. A method for full-duplex signal shaping for a full-duplex radio comprising:
    receiving a receive signal of a full-duplex radio;
    performing analog self-interference cancellation to remove a first portion of self-interference from the receive signal; wherein performing analog self-interference cancellation comprises receiving a transmit signal of a full-duplex radio; generating a set of delayed versions of the transmit signal; scaling the set of delayed versions of the transmit signal to produce a set of delayed and scaled signals; combining the set of delayed and scaled signals to create a combined signal; and subtracting the combined signal from the receive signal; and
    performing digital self-interference removal to remove a second portion of self-interference from the receive signal.

11. The method of claim 10, wherein the receive signal is received on a plurality of wireless spectrum fragments.

12. The method of claim 10, further comprising:
    after subtracting the combined signal from the receive signal, downconverting the receive signal;
    filtering the receive signal; and
    converting the receive signal from an analog signal to a digital signal before performing digital self-interference removal.

13. The method of claim 12, wherein performing digital self-interference removal comprises digital filtering.

14. The method of claim 12, wherein performing digital self-interference removal comprises cancelling linear digital self-interference and cancelling non-linear digital self-interference.

15. The method of claim 14, wherein performing digital self-interference removal further comprises correcting gain and phase error.

16. The method of claim 15, wherein performing digital self-interference removal further comprises cancelling local oscillator leakage.

17. The method of claim 14, wherein cancelling linear digital self-interference comprises estimating self-interference channel coefficients, wherein estimating self-interference channel coefficients includes selecting a subset of coefficients according to a coefficient selection algorithm.

18. The method of claim 14, wherein cancelling non-linear digital self-interference comprises estimating non-linear self-interference model coefficients, wherein estimating non-linear self-interference model coefficients includes selecting a subset of coefficients according to a coefficient selection algorithm.

19. The method of claim 10, further comprising adapting analog self-interference cancellation by determining signal path responses, measuring self-interference, and adapting the parameters of the scaling elements based on the signal path responses and the self-interference.

20. The method of claim 10, further comprising adapting analog self-interference cancellation by receiving signal path response data, generating a first self-interference signal estimate, applying a first set of parameter values based on the first self-interference signal estimate, generating a second self-interference signal estimate using the first set of parameter values, and applying a second set of parameter values based on the second self-interference signal estimate.

* * * * *